(12) United States Patent
Martin et al.

(10) Patent No.: US 8,461,817 B2
(45) Date of Patent: Jun. 11, 2013

(54) METHOD AND APPARATUS FOR PROVIDING WIRELESS POWER TO A LOAD DEVICE

(75) Inventors: Donald Corey Martin, Pittsburgh, PA (US); Charles E. Greene, Cabot, PA (US); Philip Victor Pesavento, Huntington, WV (US)

(73) Assignee: Powercast Corporation, Ligonier, PA (US)

( * ) Notice: Subject to any disclaimer, the term of this patent is extended or adjusted under 35 U.S.C. 154(b) by 1005 days.

(21) Appl. No.: 12/208,031

(22) Filed: Sep. 10, 2008

(65) Prior Publication Data
US 2009/0067208 A1 Mar. 12, 2009

Related U.S. Application Data

(60) Provisional application No. 60/993,216, filed on Sep. 11, 2007, provisional application No. 60/993,217, filed on Sep. 11, 2007.

(51) Int. Cl.
*G05F 1/00* (2006.01)
(52) U.S. Cl.
USPC .......................... 323/282; 323/284
(58) Field of Classification Search
USPC ................ 323/282, 284, 906; 363/126
See application file for complete search history.

(56) References Cited

U.S. PATENT DOCUMENTS

| | | | |
|---|---|---|---|
| 6,841,981 B2 * | 1/2005 | Smith et al. | 323/312 |
| 7,027,311 B2 * | 4/2006 | Vanderelli et al. | 363/8 |
| 7,154,250 B2 * | 12/2006 | Vinciarelli | 323/240 |
| 7,639,994 B2 | 12/2009 | Greene et al. | |
| 7,812,771 B2 | 10/2010 | Greene et al. | |
| 7,844,306 B2 | 11/2010 | Shearer et al. | |
| 7,868,482 B2 | 1/2011 | Greene et al. | |
| 2004/0239299 A1 | 12/2004 | Vinciarelli | |
| 2005/0104453 A1 | 5/2005 | Vanderelli et al. | |
| 2006/0038658 A1 * | 2/2006 | Jarvis et al. | 340/10.1 |
| 2006/0199620 A1 | 9/2006 | Greene et al. | |
| 2006/0281435 A1 | 12/2006 | Shearer et al. | |

(Continued)

FOREIGN PATENT DOCUMENTS

WO  WO 2009/036115 A1  3/2009

OTHER PUBLICATIONS

International Search Report and Written Opinion for International Application No. PCT/US2008/075939, mailed Nov. 14, 2008, 8 pages.

*Primary Examiner* — Adolf Berhane
*Assistant Examiner* — Emily Pham
(74) *Attorney, Agent, or Firm* — Cooley LLP

(57) ABSTRACT

An apparatus includes a first converter module, a second converter module, and a sensor module. The first converter module converts a wireless power associated with an electromagnetic wave to a first DC voltage. The first converter module can include, for example, a Villiard cascade voltage multiplier, a precision rectifier, or a full-wave bridge rectifier. The sensor module monitors the first DC voltage. The second converter module converts the first DC voltage to a second DC voltage that is larger than the first DC voltage. The second converter module is enabled by the sensor module when the first DC voltage is above a first threshold voltage. The second converter module is disabled by the sensor module when the first DC voltage is below a second threshold voltage that is lower than the first threshold voltage. The second converter module provides power to a load based on the second DC voltage.

23 Claims, 20 Drawing Sheets

U.S. PATENT DOCUMENTS

| | | |
|---|---|---|
| 2007/0010295 A1 | 1/2007 | Greene et al. |
| 2007/0117596 A1 | 5/2007 | Greene et al. |
| 2007/0149162 A1 | 6/2007 | Greene et al. |
| 2007/0191074 A1 | 8/2007 | Harrist et al. |
| 2007/0191075 A1 | 8/2007 | Greene et al. |
| 2007/0298846 A1 | 12/2007 | Greene et al. |
| 2008/0054638 A1 | 3/2008 | Greene et al. |
| 2008/0054729 A1 | 3/2008 | Greene et al. |
| 2008/0083969 A1* | 4/2008 | Osada .......................... 257/595 |
| 2008/0166965 A1 | 7/2008 | Greene et al. |
| 2008/0169910 A1 | 7/2008 | Greene et al. |
| 2008/0227478 A1 | 9/2008 | Greene et al. |
| 2008/0290738 A1 | 11/2008 | Greene et al. |
| 2008/0290822 A1 | 11/2008 | Greene et al. |
| 2009/0067198 A1 | 3/2009 | Graham et al. |
| 2009/0102296 A1 | 4/2009 | Greene et al. |

* cited by examiner

METHOD AND APPARATUS FOR PROVIDING WIRELESS POWER TO A LOAD DEVICE

CROSS-REFERENCE TO RELATED APPLICATIONS

This application claims priority to U.S. Provisional Patent Application Ser. No. 60/993,216, entitled "Method and Apparatus for Providing Power," filed Sep. 11, 2007; and U.S. Provisional Patent Application Ser. No. 60/993,217, entitled "Method and Apparatus for Providing Power," filed Sep. 11, 2007. Each of the above-identified U.S. patent applications is hereby incorporated herein by reference in its entirety.

This application is related to U.S. Pat. No. 7,027,311, entitled "Method And Apparatus For A Wireless Power Supply," filed Oct. 15, 2004; U.S. patent application Ser. No. 11/356,892, entitled "Method, Apparatus And System For Power Transmission," filed Feb. 16, 2006; U.S. patent application Ser. No. 11/438,508, entitled "Power Transmission Network," filed May 22, 2006; U.S. patent application Ser. No. 11/447,412, entitled "Powering Devices Using RF Energy Harvesting," filed Jun. 6, 2006; U.S. patent application Ser. No. 11/481,499, entitled "Power Transmission System," filed Jul. 6, 2006; U.S. patent application Ser. No. 11/584,983, entitled "Method And Apparatus For High Efficiency Rectification For Various Loads," filed Oct. 23, 2006; U.S. patent application Ser. No. 11/601,142, entitled "Radio Frequency (RF) Power Portal," filed Nov. 17, 2006; U.S. patent application Ser. No. 11/651,818, entitled "Pulse Transmission Method," filed Jan. 10, 2007; U.S. patent application Ser. No. 11/699,148, entitled "Power Transmission Network And Method," filed Jan. 29, 2007; U.S. patent application Ser. No. 11/705,303, entitled "Implementation Of An RF Power Transmitter And Network," filed Feb. 12, 2007; U.S. patent application Ser. No. 11/494,108, entitled "Method And Apparatus For Implementation Of A Wireless Power Supply," filed Jul. 27, 2009; U.S. patent application Ser. No. 11/811,081, entitled "Wireless Power Transmission," filed Jun. 8, 2007; U.S. patent application Ser. No. 11/881,203, entitled "RF Power Transmission Network And Method," filed Jul. 26, 2007; U.S. patent application Ser. No. 11/897,346, entitled "Hybrid Power Harvesting And Method," filed Aug. 30, 2007; U.S. patent application Ser. No. 11/897,345, entitled "RF Powered Specialty Lighting, Motion, Sound," filed Aug. 30, 2007; U.S. patent application Ser. No. 12/006,547, entitled "Wirelessly Powered Specialty Lighting, Motion, Sound," filed Jan. 3, 2008; U.S. patent application Ser. No. 12/005,696, entitled "Powering Cell Phones and Similar Devices Using RF Energy Harvesting," filed Dec. 28, 2007; U.S. patent application Ser. No. 12/005,737, entitled "Implementation of a Wireless Power Transmitter and Method," filed Dec. 28, 2007; U.S. patent application Ser. No. 12/048,529, entitled "Multiple Frequency Transmitter, Receiver, and System Thereof," filed Mar. 14, 2008; U.S. patent application Ser. No. 12/125,516, entitled "Item and Method for Wirelessly Powering the Item," filed May 22, 2008; U.S. patent application Ser. No. 12/125,532, entitled "Smart Receiver and Method," filed May 22, 2008; and U.S. patent application Ser. No. 12/200,422, entitled "Contactless Power Supply," filed Aug. 28, 2008.

The above-identified U.S. patent and U.S. patent applications are hereby incorporated herein by reference in their entirety.

BACKGROUND

The systems and methods disclosed relate generally to wireless power transfer and more particularly to the conversion of wireless power to direct current (DC) power.

The increased performance and decreased power requirements of integrated circuits has resulted in an explosion of devices that operate completely independent of wires or power cords. These "untethered" devices range from cell phones and wireless keyboards to building sensors and active Radio Frequency Identification (RFID) tags. Engineers and designers, however, continue to face limitations in the storage capacity of portable power sources, primarily batteries, which can be used to provide power to these devices. Battery technology, and particularly battery storage capacity, has only been growing at a meager 6% per year. Even with the use of power-efficient integrated circuits, the storage capacity of today's batteries is unable to keep up with the power requirements of many untethered device applications.

One approach to address the limitations in today's battery technology has been to harness sufficient energy or power from the environment (e.g., ambient power) or from a transmitter (e.g., radio frequency (RF) power) for use in the untethered device. The harnessed power would then be converted to a DC power to directly power an untethered device or to recharge a battery or other storage component. Directly powering an untethered device enables the device to be constructed without the need for a battery. Recharging a storage component could increase the time of operation of the device. Other preferred benefits include the untethered device being able to be used in a wide range of environments, including harsh and sealed environments (e.g., nuclear reactors), to be inexpensive to produce, to be safe for humans, and to have a minimal effect on the basic size, weight and other physical characteristics of the untethered device.

In many instances, however, the amount or level of energy or power available for harnessing is very low (e.g., −20 dBm or lower). In such instances, a wireless power receiver used to convert the incident power to a DC voltage typically uses a resistive load such that even low levels of incident power produce a large DC voltage. For example, the DC voltage varies proportionately with the incident power This approach, however, does not result in a constant or reliable DC voltage (or DC power) that is suitable to operate an untethered device. Although a lower DC voltage may be desirable to efficiently convert low power levels, many untethered devices require large DC voltages to operate. Moreover, this approach is effective only when the incident power is characterized by a relatively narrow frequency spectrum, thus limiting the ability to harness or collect power in areas where the incident power has is associated with a wide frequency spectrum. In addition, at low power levels, it is also desirable that the conversion circuitry and/or the battery charging circuitry in the wireless power receiver operate such that the net charge or power delivered to the battery is increased. In other words, it is desirable to reduce or minimize the amount of reverse current that is drained through the wireless power receiver from the battery during the charging process.

Thus, a need exists for a wireless power receiver that can operate at low levels of incident power, can convert incident power characterized by a wide frequency spectrum to DC power, can efficiently recharge a battery in an untethered device, and/or can efficiently operate an untethered device.

SUMMARY

In one or more embodiments, an apparatus includes a first converter module, a second converter module, and a sensor module. The first converter module converts a wireless power associated with an electromagnetic wave to a first DC voltage. The first converter module can include, for example, a Villiard cascade voltage multiplier, a precision rectifier, or a full-wave bridge rectifier. The sensor module monitors the first DC voltage. The second converter module converts the first DC voltage to a second DC voltage that is larger than the first DC voltage. The second converter module is enabled by the sensor module when the first DC voltage is above a first threshold voltage. The second converter module is disabled by the sensor module when the first DC voltage is below a second threshold voltage that is lower than the first threshold voltage. The second converter module provides power to a load based on the second DC voltage.

DETAILED DESCRIPTION

Figure 1A:
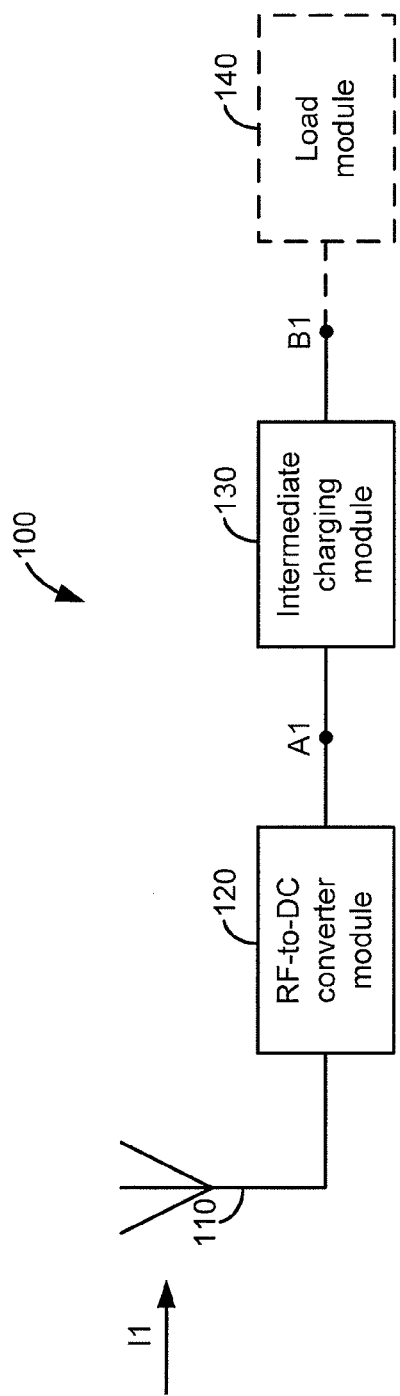
FIGS. 1A-1B are system block diagrams each depicting a wireless power receiver and load module, according to embodiments.

The methods and systems disclosed herein describe a wireless power receiver having a RF-to-direct-current (RF-to-DC) converter suitable for harvesting low power levels such as the power levels associated with ambient power. The wireless power receiver can be used to power or charge a load device or load module. For example, the wireless power receiver can be used to illuminate a light emitting device (e.g., a light emitting diode (LED)). In another example, the wireless power receiver can be used to charge a rechargeable battery. In this regard, one or more embodiments of the wireless power receiver can minimize or reduce an amount of reverse current drain or reverse current leakage that typically occurs through charging circuitry.

In one embodiment, an apparatus includes a first converter module, a sensor module, and a second converter module. The first converter module is configured to convert a wireless power associated with an electromagnetic wave to a first DC voltage. The sensor module is configured to monitor the first DC voltage and produce an output associated with the first DC voltage. The second converter module is configured to convert the first DC voltage to a second DC voltage larger than the first DC voltage. The second converter module is configured to be enabled by the output from the sensor module when the first DC voltage is above a first threshold voltage. The second converter module is configured to be disabled by the output from the sensor module when the first DC voltage is below a second threshold voltage lower than the first threshold voltage. The second converter module is configured to provide power to a load device based on the second DC voltage.

The apparatus can include an antenna and an impedance matching module. The antenna is configured to receive the electromagnetic wave. The impedance matching module is configured to substantially match an impedance of the first converter module and an impedance of the antenna over a frequency range including a center frequency associated with the electromagnetic wave. The first converter module can include, for example, a single-stage or multi-stage Villiard cascade voltage multiplier, a full-wave bridge rectifier, a half-wave rectifier, a full-wave voltage doubler, or a precision rectifier. For example, the first converter module can include a Villiard cascade voltage multiplier having an input portion and an output portion. The input portion of the Villiard cascade voltage multiplier is coupled to the antenna via the impedance matching module. The output portion of the Villiard cascade voltage multiplier is coupled to the sensor module and the second converter.

In another embodiment, the apparatus described above can include an antenna, a third converter module, a fourth converter module, a first impedance matching module, a second impedance matching module, a selector module, and a combiner module. The antenna is configured to receive the electromagnetic wave. The third converter module is configured to convert a second wireless power associated with the electromagnetic wave to a third DC voltage. The fourth converter module is configured to convert the third DC voltage to a fourth DC voltage larger than the third DC voltage. The first impedance matching module is configured to substantially match an impedance of the first converter module and an impedance of the antenna over a first frequency range. The second impedance matching module is configured to substantially match an impedance of the third converter module and the impedance of the antenna over a second frequency range different from the first frequency range. The selector module is configured to couple the first impedance matching module and the second impedance matching module to the antenna. The combiner module is configured to add the second DC voltage from the second converter module and the fourth DC voltage from the fourth converter module to produce a combined voltage. The combiner module is configured to charge a load device based the combined voltage.

In yet another embodiment, an apparatus includes a first converter module, a storage device, and a second converter module. The first converter module is configured to convert a first wireless power received via a first antenna to a first DC voltage. The storage device is configured to store a charge associated with the first DC voltage. The second converter module is configured to convert a second wireless power received via a second antenna to a second DC voltage. The first wireless power can be associated with a first radio frequency spectrum and the second wireless power can be associated with a second radio frequency spectrum different from the first radio frequency spectrum. The second converter module is configured to be biased by the charge from the storage device. The second converter module is configured to provide power to a load device based on the second DC voltage. The second converter module can be configured to send a reverse current received from the load device to the storage device.

In another embodiment, an apparatus includes a first storage device, a second storage device, a converter module, and a switch module. The converter module is configured to convert a wireless power received via an antenna to a DC voltage. The switch module has a first configuration and a second configuration. The switch module is configured to couple the converter module to the first storage device when in the first configuration. The switch module is configured to couple the converter module to the second storage device when in the second configuration. The first storage device is configured to store a charge associated with the DC voltage from the converter module when the first storage device is coupled to the converter module via the switch module. The second storage device is configured to store a charge associated with the DC voltage from the converter module when the second storage device is coupled to the converter module via the switch module. The first storage device and the second storage device are collectively configured to charge a load device.

The apparatus can include a control module that is configured to produce an output to configure the switch module in the first configuration or the second configuration. The switch module is configured to receive the output from the control module. The control module can be configured to monitor a voltage associated with a charge stored in the first storage device and a charge stored in the second storage device. The control module can be configured to produce an output to configure the switch module in the first configuration or the second configuration based on at least one of the voltage associated with the charge stored in the first storage device or the voltage associated with the charge stored in the second storage device. The control module can be configured to receive a signal having timing information. The control module can be configured to produce an output to configure the switch module in the first configuration or the second configuration based on the timing information.

In yet another embodiment, an apparatus includes a first storage device, a second storage device, a converter module, and a switch module. The converter module is configured to convert a wireless power received via an antenna to a DC voltage. The switch module has a first configuration and a second configuration. The switch module is configured to couple the first storage device, the second storage device, and the converter module in a parallel configuration when in the first configuration. The switch module is configured to couple the first storage device, the second storage device, and a load in a series configuration when in the second configuration. The first storage device is configured to store a charge associated with the DC voltage from the converter module when the first storage device is coupled to the converter module via the switch. The second storage device is configured to store a charge associated with the DC voltage from the converter module when the second storage device is coupled to the converter module via the switch module. The first storage device and the second storage device are collectively config-
ured to charge the load device when the first storage device and the second storage device are coupled to the load device via the switch module.

It is noted that, as used in this written description and the appended claims, the singular forms "a," "an" and "the" include plural referents unless the context clearly dictates otherwise. Thus, for example, the term "a wave" is intended to mean a single wave or a combination of waves.

Figure 1B:
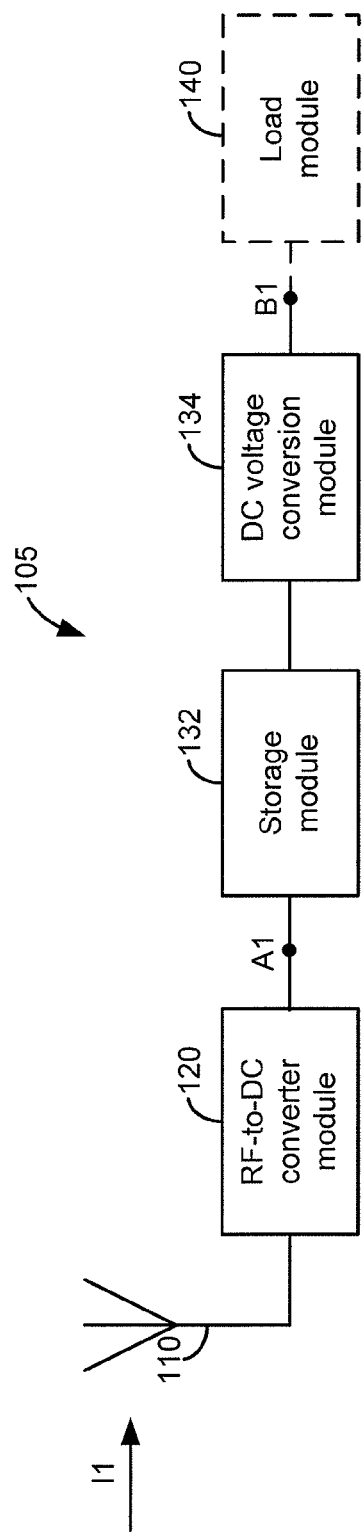

FIGS. 1A-1B are system block diagrams each depicting a wireless power receiver and load module, according to embodiments. FIG. 1A shows a wireless power receiver 100 configured to be used with an untethered device to harvest low levels of incident wireless power and convert the incident wireless power to a DC power. The wireless power receiver 100 includes an antenna 110, an RF-to-DC converter module 120, and an intermediate charging module 130. In some embodiments, the wireless power receiver 100 can include a load module 140. In other embodiments, the load module 140 is separate from (but coupled to) the wireless power receiver 100. The RF-to-DC converter module 120, the intermediate charging module 130, and/or the load module 140 can be hardware-based (e.g., circuit system, processor, application-specific integrated circuit (ASIC), field programmable gate array (FPGA)) or hardware-based and software-based (e.g., set of instructions executable at a processor, software code).

Figure 1C:
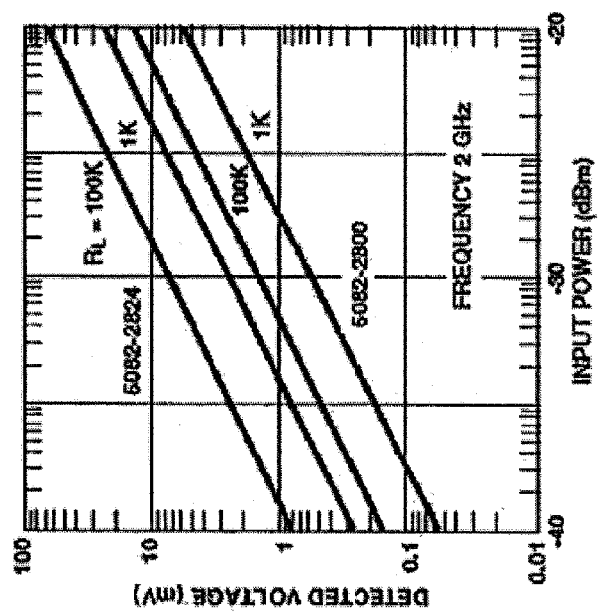
FIG. 1C is a typical square law response between incident power level and output voltage.

The wireless power receiver 100 can be used in instances when a relatively large DC voltage (e.g., 1.5 volts or higher) is desirable to charge or to operate the load module 140 and the incident wireless power level is sufficiently low (e.g., −20 dBm or lower) that producing a relatively large DC voltage from the RF-to-DC converter module 120 would result in power conversion inefficiencies. For example, FIG. 1C illustrates a square law response between the incident wireless power level and the DC voltage. Even a small incident wireless power level of −20 dBm can result in a DC voltage output of about 0.1 volts when a resistive load of 100 kilo ohms is considered.

The antenna 110 is configured to receive an input I1 having a wireless power associated with one or more electromagnetic waves. The wireless power associated with the input I1 can be ambient power or can be wireless power transmitted by a dedicated wireless power source (not shown). The wireless power associated with the input I1 can have a low power level. For example, the wireless power can be approximately −20 dBm (10 microwatts) or lower. The antenna 110 can be a dipole antenna, for example. The antenna 110 can be optimized, for example, to receive electromagnetic waves at or near the center or nominal frequency associated with the input I1.

The RF-to-DC converter 120 is configured to convert the wireless power received via the antenna 110 to a DC power (e.g., RF-to-DC conversion). In this regard, node A1 between the RF-to-DC converter 120 and the intermediate charging module 130 corresponds to a DC voltage associated with the DC power produced by the RF-to-DC converter 120. The RF-to-DC converter 120 is configured such that the DC voltage associated with the DC power is lower than a DC voltage required by the load module 140.

The intermediate charging module 130 is configured to receive the DC power from the RF-to-DC converter 120. In some embodiments, the intermediate charging module 130 is configured to stored the DC power and subsequently transfer the stored DC power to the load module 140. In some embodiments, the intermediate charging module 130 is configured to modify the DC voltage associated with the DC power from the RF-to-DC converter 120 to a DC voltage larger than the DC voltage associated with the DC power such that the DC voltage provided to the load module 140 (at node B1) is sufficiently large to charge or operate the load module 140. The intermediate charging module 130 can increase (e.g., up-convert, step-up) the DC voltage at node A1 to a larger DC voltage at node B1 by using one or more circuits configured to multiply or increase a DC voltage. In this regard, multiple circuits can be used to increase the multiplication factor such that the DC voltage at node B1 is of an appropriate level. In some embodiments, at least a portion of the increase in the DC voltage provided by the intermediate charging module 130 can be performed by the RF-to-DC converter 120.

The load module 140 (e.g., a rechargeable battery) is configured to store a DC power or to operate (e.g., an electronic device) based on a DC power that is provided by the intermediate charging module 130. In this regard, it may be desirable that the load module 140 receive a constant and reliable DC voltage associated with the DC power from the intermediate charging module 130 to charge or operate effectively.

FIG. 1B shows a wireless power receiver 105 that includes the antenna 110, the RF-to-DC converter module 120, a storage module 132, and a DC voltage conversion module 134. In some embodiments, the wireless power receiver 105 includes the load module 140. In other embodiments, the load module 140 is separate from (but coupled to) the wireless power supply 105. The RF-to-DC converter module 120, the storage module 132, the DC voltage conversion module 134, and/or the load module 140 can be hardware-based or hardware-based and software-based.

The wireless power receiver 105 can also be used in instances when a relatively large DC voltage is desirable to charge or to operate the load module 140 and the incident wireless power level is sufficiently low that producing a relatively large DC voltage from the RF-to-DC converter module 120 would result in power conversion inefficiencies. In this regard, the storage module 132 is configured to receive and store the DC power from the RF-to-DC converter module 120. In some embodiments, the storage module 132 can include a capacitor and/or a rechargeable battery, for example. The storage module 132 is configured to send or transfer the stored DC power to the DC voltage conversion module 134. The storage module 132 is configured to reduce or minimize a reverse or leakage current drain from the load module 140 through the DC voltage conversion module 134. For example, the storage module 132 can be configured to limit the reverse current drain from the load module 140 to approximately 200 nanoamps to 300 nanoamps.

The DC voltage conversion module 134 is configured to modify (e.g., up-convert, step-up) the DC voltage associated with stored DC power received from the storage module 132 to a larger DC voltage such that the DC voltage provided to the load module 140 (at node B1) is sufficiently large to charge or operate the load module 140. The DC voltage conversion module 134 can increase the DC voltage associated with the stored DC power to a larger DC voltage at node B1 by using one or more circuits configured to multiply or increase a DC voltage. For example, the DC voltage conversion module 134 can include a DC-to-DC converter (not shown), and/or a charge pump (not shown). In some embodiments, the DC voltage conversion module 134 can include multiple circuits in a serial configuration to increase the multiplication factor such that the DC voltage at node B1 is of an appropriate level. The DC voltage conversion module 134 and the storage module 132 can be hardware-based, or hardware-based and software-based.

Figure 2A:
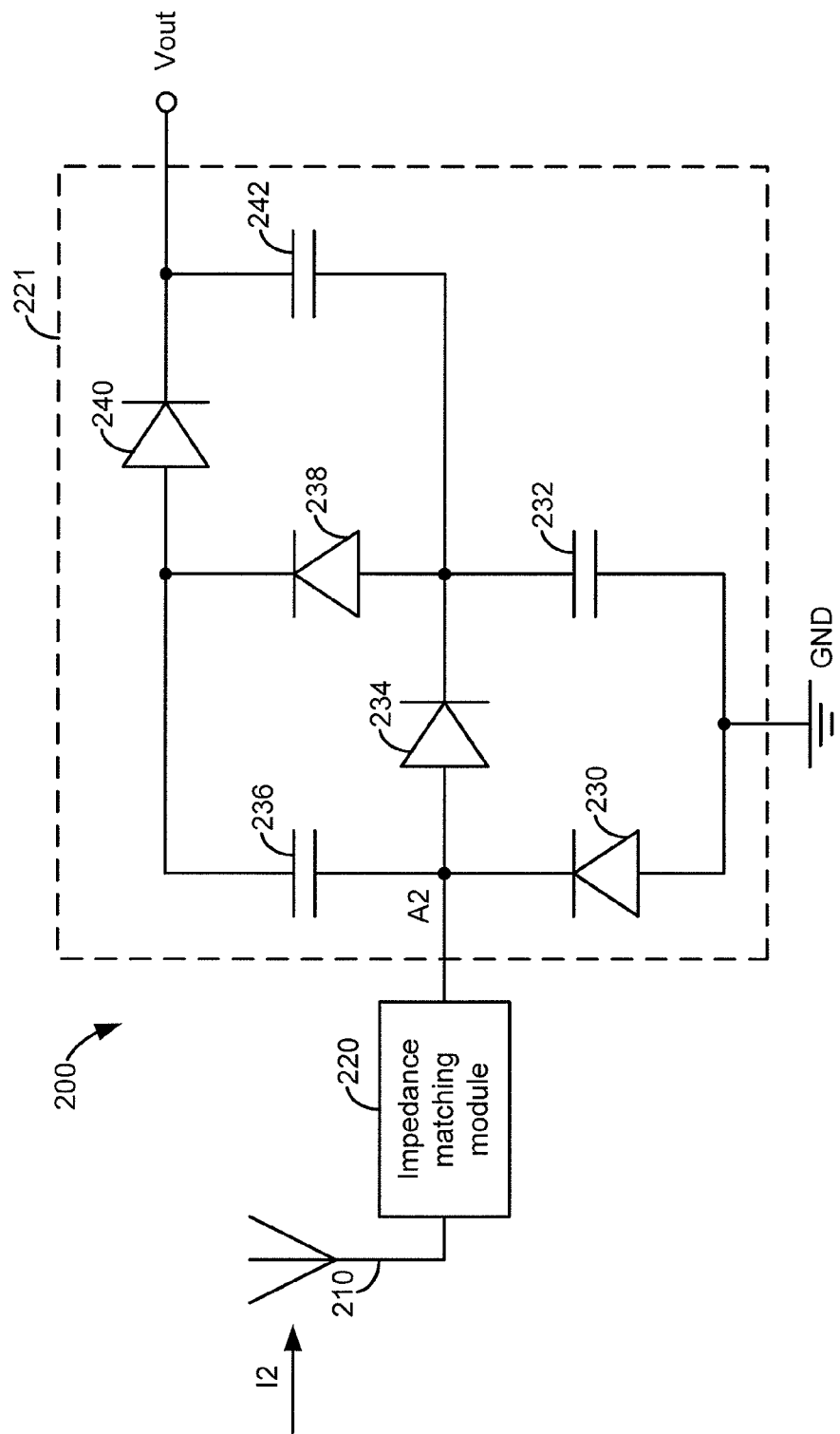
FIGS. 2A-2B are system block diagrams each depicting an RF-to-DC converter in a wireless power receiver, according to an embodiment.

FIG. 2A is a system block diagram illustrating an RF-to-DC converter 221 in a wireless power receiver 200, according to an embodiment. The wireless power receiver 200 includes an antenna 210, an impedance matching module 220, and the RF-to-DC converter 221. The wireless power receiver 200 is configured to be used in instances when the incident wireless power level (e.g., ambient power level) is very low.

The antenna 210 can be similar to the antenna 110 described above with respect to FIGS. 1A-1B. The antenna 210 is configured to receive an input I2 having a wireless power associated with one or more electromagnetic waves. The impedance matching module 220 is configured to substantially match an impedance (e.g., output impedance) of the antenna 210 and an impedance (e.g., input impedance) of the RF-to-DC converter 221 over a frequency range that includes a center frequency associated with an electromagnetic wave from the one or more electromagnetic waves associated with the input I2 received by the antenna 210. The impedance matching module 220 can include a combination of transformers (not shown), resistors (not shown), inductors (not shown), and/or capacitors (not shown) to minimize reflections (i.e., maximize power transfer) that occur when the received wireless power passes from the antenna 210 to the RF-to-DC converter 221.

The RF-to-DC converter 221 is configured to receive the wireless power associated with the input I1 received by the antenna 210. The RF-to-DC converter 221 is configured to convert the wireless power (e.g., RF power) to a DC power. The RF-to-DC converter 221 can include one or more RF-to-DC converters configured to operate with relatively low incident wireless power levels (i.e., low RF current and/or low RF voltage from the antenna 210). In this embodiment, the RF-to-DC converter 221 includes a Villiard cascade voltage multiplier having diodes 230, 234, 238, and 240, and capacitors 232, 236, and 242. The Villiard cascade voltage multiplier included in the RF-to-DC converter 221 is a two-stage voltage multiplier (i.e., voltage quadrupler) configured to produce a DC voltage output (Vout) that is a multiple of the peak voltage of the voltage (at node A2) associated with the received wireless power. In this regard, the Villiard cascade voltage multiplier included in the RF-to-DC converter 221 is configured to produce a DC voltage output having a level twice the peak voltage level of the voltage associated with the received wireless power.

Figure 2B:
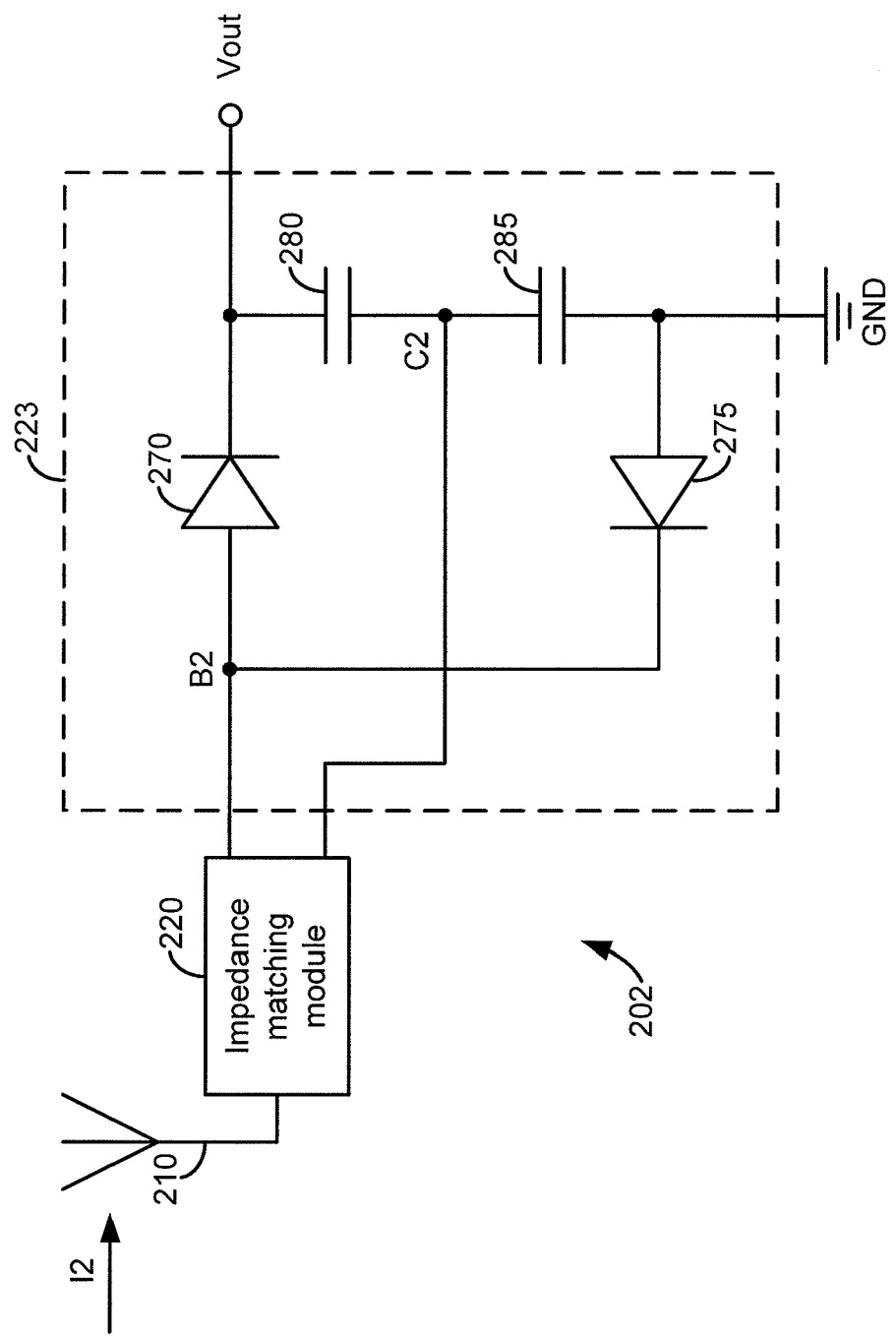

FIG. 2B is a system block diagram illustrating an RF-to-DC converter 223 in a wireless power receiver 202, according to yet another embodiment. The wireless power receiver 202 includes the antenna 210, the impedance matching module 220, and the RF-to-DC converter 223. The wireless power receiver 202 is configured to be used in instances when the incident wireless power level is very low. In this embodiment, the RF-to-DC converter 223 can be considered a full-wave voltage doubler having diodes 270 and 275 and capacitors 280 and 285. The full-wave voltage doubler of the RF-to-DC converter 223 is configured to produce a DC voltage output (Vout) that is twice the voltage across nodes B2 and C2 and associated with a differential voltage from the impedance matching module 220.

In other embodiments, the RF-to-DC converters described above with respect to FIGS. 2A-2B can include a half-wave rectifier and/or a full-wave bridge rectifier, for example.

Figure 3:
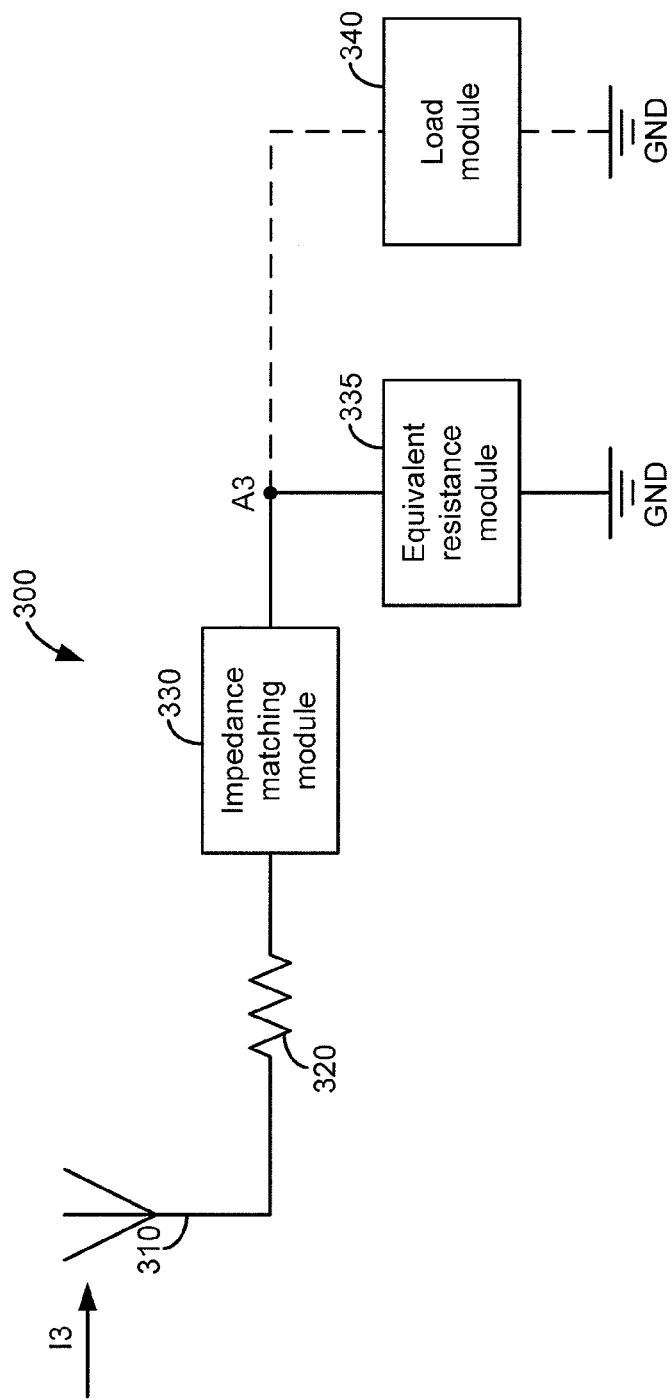
FIG. 3 is a system block diagram of an equivalent circuit for a wireless power receiver, according to another embodiment.

FIG. 3 is a system block diagram of an equivalent circuit for a wireless power receiver 300, according to another embodiment. The equivalent circuit of the wireless power receiver 300 includes an antenna 310, a resistor 320, an impedance matching module 330, and a equivalent resistance module 335. In some embodiments, the wireless power receiver 300 can include a load module 340. In other embodiments, the load module 340 is separate from (but coupled to) the wireless power receiver 300.

The antenna 310 can be similar to the antenna 110 described above with respect to FIGS. 1A-1B. The antenna 310 is configured to receive an input I3 having a wireless power associated with one or more electromagnetic waves. The resistor 320 is, for example, a 50 ohm resistor that corresponds (i.e., equals or in addition to) or represents a characteristic impedance of the antenna 310. The impedance matching module 330 is configured to substantially match the characteristic impedance associated with the antenna 310 and an impedance of the equivalent impedance module 335 over a frequency range that includes a center frequency associated with an electromagnetic wave from the one or more electromagnetic waves associated with the input I3 received by the antenna 310. The equivalent impedance module 335 is associated with the input equivalent impedance (e.g., complex impedance) of an RF-to-DC converter in the wireless power receiver 300. The load module 340 can be similar to the module 140 described above with respect to FIGS. 1A-1B.

When the impedance matching module 330 substantially matches the impedance of the equivalent impedance module 335 and the 50 ohm characteristic impedance of the antenna 310, a substantial portion of the wireless power received via the antenna 310 is received by the RF-to-DC converter represented by the equivalent impedance module 335. When the impedance of the equivalent impedance module 335 and the 50 ohm characteristic impedance of the antenna 310 do not substantially match, a small portion (or no portion) of the wireless power received via the antenna 310 is received by the RF-to-DC converter represented by the equivalent impedance module 335.

For the RF-to-DC converter represented by the equivalent impedance module 335 to charge the load module 340, it is desirable that the voltage at node A3 be larger than the voltage of the load module 340 (e.g., battery voltage). In this regard, the minimum equivalent resistance ($R_{eq}$) of the equivalent impedance module 335 is determined as follows:

$$R_{eq}(min)=[(0.707)*V_{load}]^2/P_{in},$$

where $V_{load}$ is the voltage of the load module 340 and $P_{in}$ is the received wireless power in root-mean-square (RMS) value. In one example, for a −20 dBm received wireless power and a 1.5 volt load module 340 charging voltage, the $R_{eq}$ is 112.466 kiloohms and the impedance matching module 330 matches the 50 Ohm characteristic impedance of the resistor 320 to the 112.466 kiloohms equivalent resistance of the equivalent impedance module 335.

Figure 4A:
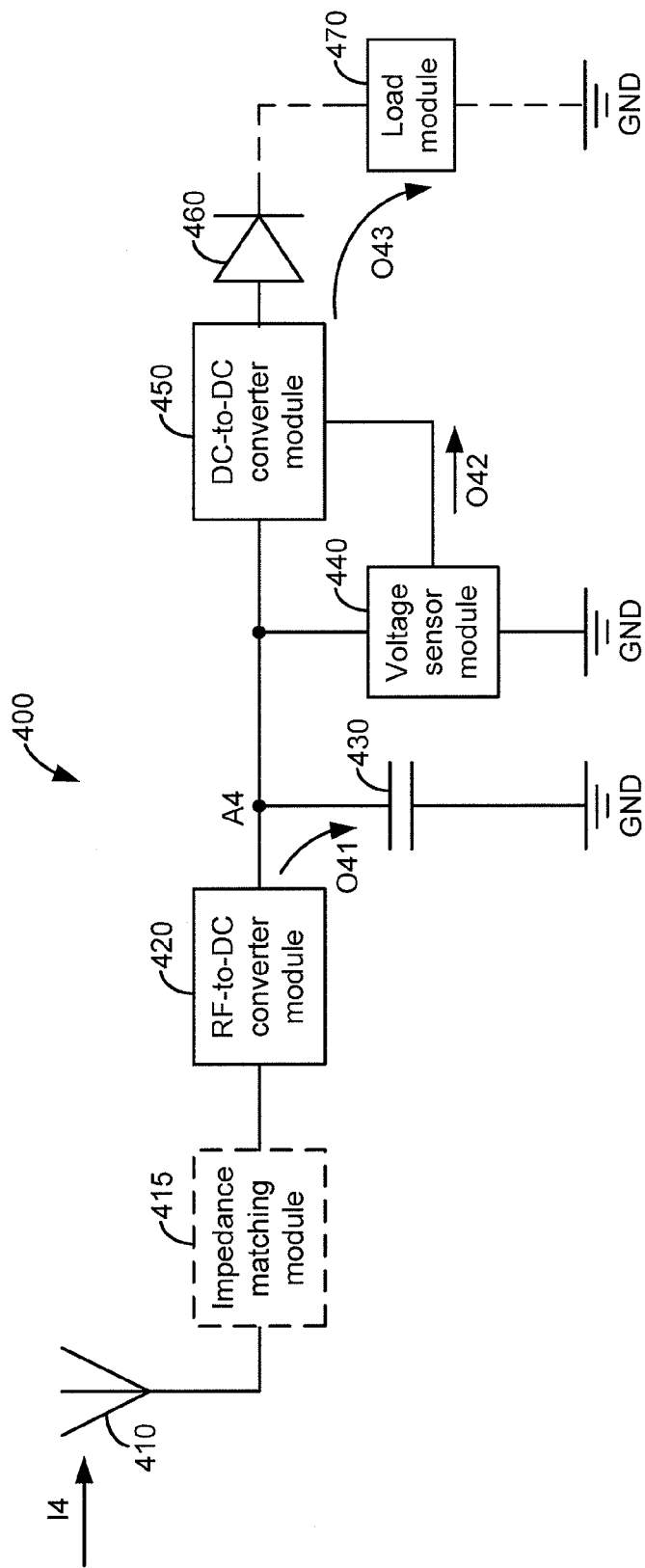
FIG. 4A is a system block diagram of a low-power wireless power receiver with a DC-to-DC converter module, according to another embodiment.

FIG. 4A is a system block diagram of a wireless power receiver 400 with a DC-to-DC converter module 450, according to another embodiment. The wireless power 400 includes an antenna 410, an RF-to-DC converter module 420, a capacitor 430, a voltage sensor module 440, the DC-to-DC converter 450, and a diode 460. In some embodiments, the wireless power receiver 400 can include a load module 470 and/or an impedance matching module 415. In other embodiments, the load module 470 is separate from (but coupled to) the wireless power receiver 400. The wireless power receiver 400 is configured to be used in instances when the incident wireless power is very low.

The antenna 410 is similar to the antenna 110 described above with respect to FIGS. 1A-1B. The RF-to-DC converter module 450 is similar to the RF-to-DC converter modules 120, 221, and 223, described above with respect to FIGS. 1A-1B and FIGS. 2A-2B. The impedance matching module 415, the RF-to-DC converter module 420, the voltage sensor module 440, and/or the DC-to-DC converter module 450 can be hardware-based, or hardware-based and software-based.

The capacitor 430 is configured to store a charge or power associated with an output O41 produced by the RF-to-DC converter module 420. The output O41 includes a DC power that is produced by the RF-to-DC converter module 450 from a wireless power associated with an input I4 received via the antenna 410. As the charge or power in the capacitor 430 changes, a DC voltage (at node A4) associated with the charge or power being stored in the capacitor 430 also changes.

The voltage sensor module 440 is configured to monitor the DC voltage at node A4. Said differently, the voltage sensor module 440 monitors the amount of charge or power stored in the capacitor 430 and associated with the DC power produced by the RF-to-DC converter module 450. The voltage sensor module 440 is configured to produce an output O42. The output O42 indicates when the DC voltage at node A4 is at or above a first threshold voltage ($V_H$) and when the DC voltage at node A4 is at or below a second threshold voltage ($V_L$) that is lower than $V_H$. When the DC voltage at node A4 is charging (i.e., storing charge or power) and reaches a voltage that is substantially the same or higher than $V_H$, the output O42 enables the DC-to-DC converter module 450. When the DC voltage at node A4 is discharging (i.e., charging the load module 470) and drops to a voltage that is substantially the same or below $V_L$, the output O42 disables the DC-to-DC converter module 450.

The DC-to-DC converter 450 is configured to convert the DC voltage at node A4 to a voltage that is larger than the DC voltage at node A4. In this regard, the DC-to-DC converter is configured to up-convert, step-up, increase, or multiply the DC voltage at node A4. The DC-to-DC converter 450 is configured to produce an output O43 having a DC power with an associated DC voltage that is larger than the DC voltage at node A4. DC current flowing from the DC-to-DC converter 450 via the output O43 and through the diode 460 can be used to charge or power the load module 470. The DC-to-DC converter 450 can include a boost converter, for example.

The diode 460 can prevent or reduce a reverse or leakage current from flowing from the load module 470 to the DC-to-DC converter module 450 such as to drain the load module 470 and reduce the net charging or charging efficiency of the wireless power receiver 400. Because charging currents are very small when the incident wireless power is −20 dBm or lower, using the diode 460 can eliminate or minimize any unnecessary drain on the load module 470.

Figure 4B:
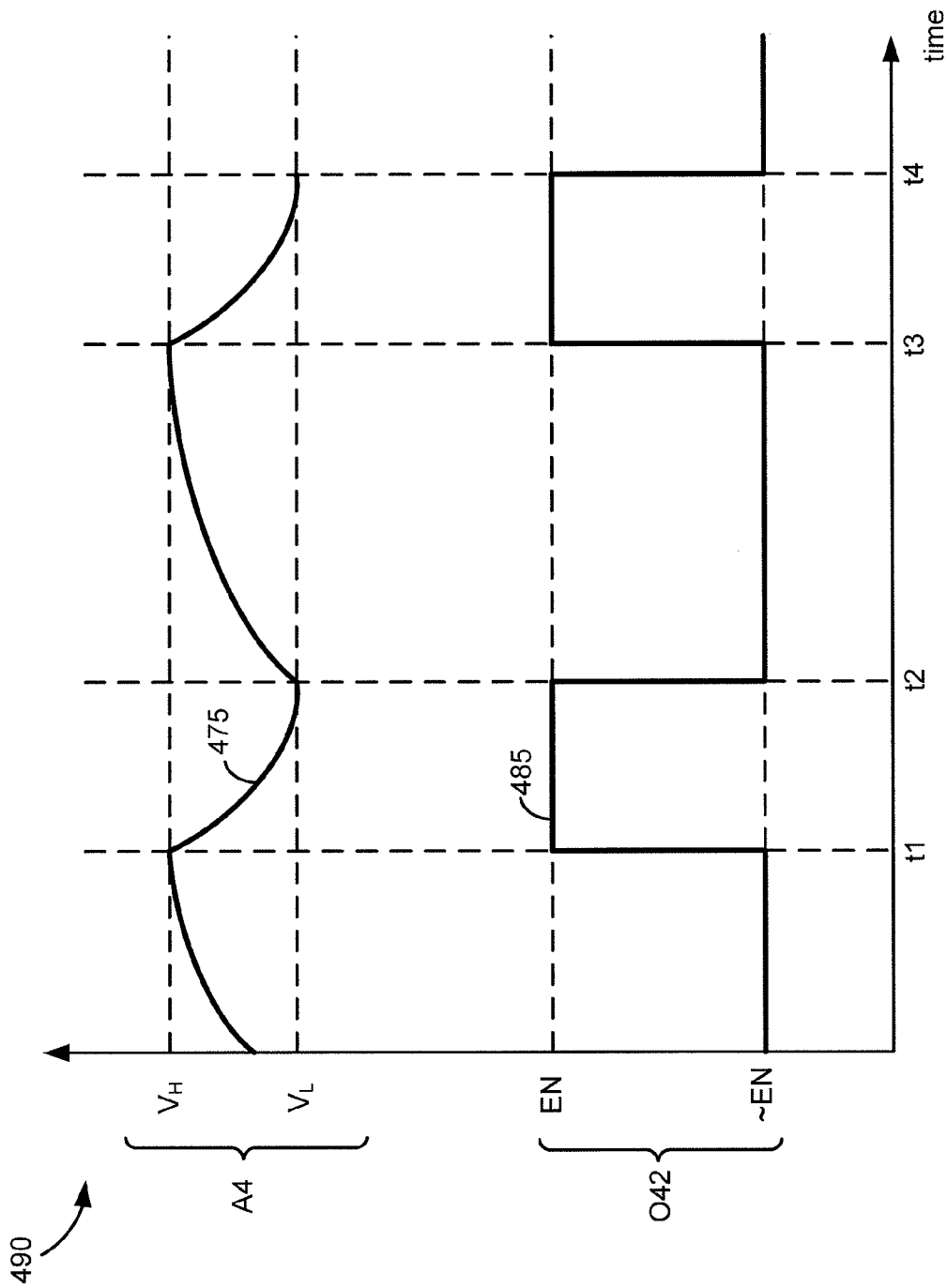
FIG. 4B is a timing diagram illustrating a pulsed charge operation of the wireless power receiver of FIG. 4A, according to an embodiment.

FIG. 4B is a timing diagram 490 illustrating a pulsed charge operation of the low-power wireless power receiver of FIG. 4A, according to an embodiment. When the load module 470 is charging, the capacitor 430 is discharging and the DC voltage 475 (at node A4) drops. Once the DC voltage 475 drops to a voltage that is substantially the same or below $V_L$, the voltage sensor module 440 disables the DC-to-DC converter 450 via a disable signal (~EN) in the output O42 such that the capacitor 430 can be recharged by the RF-to-DC converter module 420. When the charging of capacitor 430 increases the DC voltage 475 to a voltage that is substantially the same or above $V_H$, the voltage sensor module 440 enables the DC-to-DC converter 450 via an enable signal (EN) in the output O42 such that the load module 470 can begin to charge again. The operation described above can be repeated multiple times such that multiple charge pulses or bursts occur when charging the load module 470. In this regard, the frequency of the charge pulses or bursts associated with the operation of the wireless power receiver 400 is based on the capacitance of the capacitor 430.

It is desirable that the value of the capacitance of the capacitor 430 be chosen such that a balance occurs between the time period during which the capacitor 430 is being charged by the RF-to-DC converter module 420 and the time period during which charge or power in the capacitor 430 is transferred to the load module 470. Increasing the value of the capacitance of the capacitor 430 can result in a longer time period during which the load module 470 is charged but with an associated decrease in charging frequency. Similarly, decreasing the value of the capacitance of the capacitor 430 can result in a shorter time period during which the load module 470 is charged but with an associated increase in charging frequency.

It is desirable that voltage sensor module 440 be configured such that the first threshold voltage, $V_H$, is sufficiently large to allow the DC voltage associated with the DC power in the output O43 to be larger than the charging voltage of the load module 470. Moreover, if $V_H$ is used as a logic high (enable signal EN) to control the DC-to-DC converter module 450, the value of $V_H$ needs to be sufficiently large to enable the operation of the DC-to-DC converter module 450. In addition, $V_H$ needs to be sufficiently large to be stepped up (up-converted) sufficiently to charge the load module 470. It is also desirable that voltage sensor module 440 be configured such that $V_H$ is sufficiently low to provide better impedance matching.

When the DC-to-DC converter module 450 includes a commercially available device (e.g., an integrated circuit), the value of $V_H$ can be based on operating parameters (e.g., datasheet parameters) associated with the DC-to-DC converter module 450. For example, it is desirable that the DC voltage associated with the output O43 be as large as possible such that a larger potential difference occurs between the output O43 and the charging voltage of the load module 470. It is also desirable that the DC-to-DC converter module 450 be configured to operate with a small DC voltage at node A4. Moreover, it is desirable that the DC-to-DC converter module 450 quiescent current be small to provide circuit efficiency. It is also desirable that the DC-to-DC converter module 450 have an small leakage current during its OFF state (e.g., disabled) such that the charge or power from the output O41 is being stored in the capacitor 430 and not drained via the DC-to-DC converter module 450.

Figure 5A:
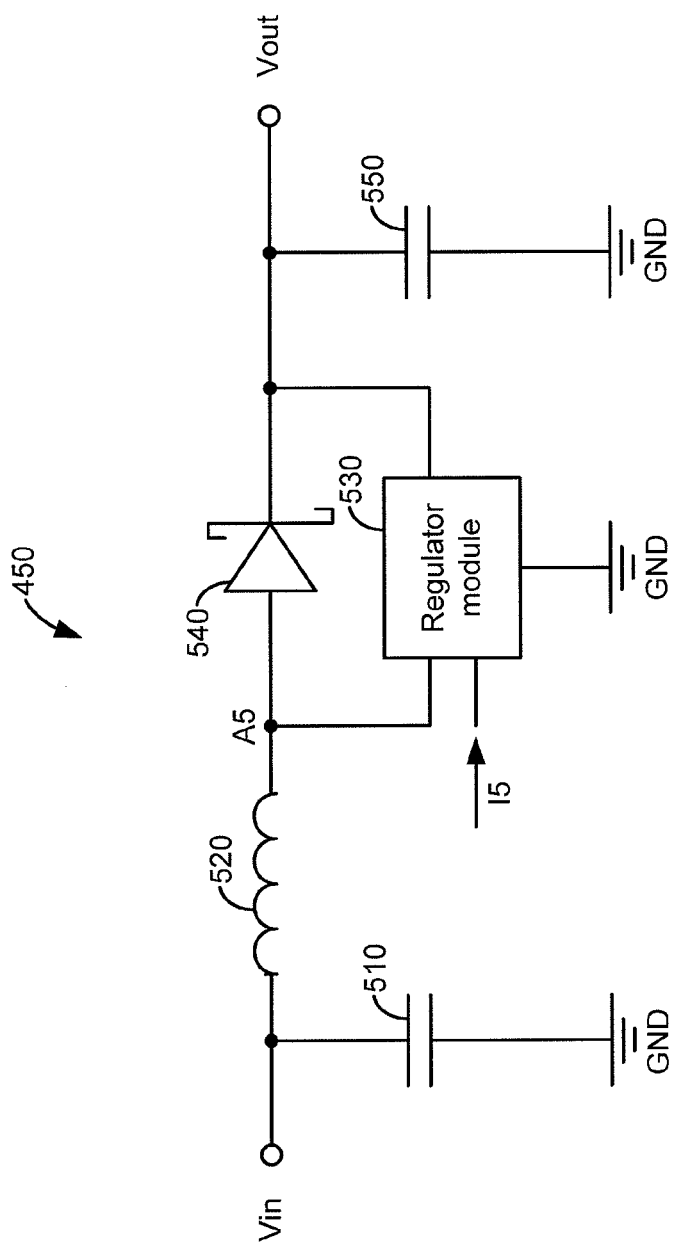
FIG. 5A is a system block diagram of a DC-to-DC converter module, according to an embodiment.

FIG. 5A is a system block diagram of the DC-to-DC converter module 450 in FIG. 4A including a boost converter circuit, according to an embodiment. The boost converter circuit included in the DC-to-DC converter module 450 has a capacitor 510, an inductor 520, a regulator module 530, a Schottky diode 540, and a capacitor 550. In this example, the capacitor 510 has a capacitance of 10 microfarads, the inductor 520 has an inductance of 33 microhenries, and the capacitor 550 has a capacitance of 6.8 nanofarads. The regulator module 530 is configured to enable or disable the operation of the DC-to-DC converter module 450 based on an input I5. The input I5 can correspond to the output O42 from the voltage sensor module 440 described above with respect to FIG. 4A.

It is desirable that the inductor 520 has a large inductance value such that the inductor 520 allows for faster charging. It is also desirable that the inductor 520 has a low DC resistance value (e.g., less than 1 Ohm) to minimize loss and to have a saturation current greater than the peak current that is likely to flow through the inductor 520. Moreover, it is desirable that the capacitor 550 has a smaller capacitance value to allow the output voltage (Vout) to transition more rapidly over time and to provide higher current peaks at the output of the DC-to-DC converter module 450 over a longer period of time.

The value of the capacitor 510 can be selected to stabilize the input voltage (Vin) and minimize the peak current ripple that can occur from the source of the input voltage (e.g., DC voltage at node A5). The Schottky diode 540 can be selected to have a small forward voltage, a small reverse leakage current, fast recovery time, a rated current that is greater than the peak current of the inductor 520, and a reverse voltage that is larger than Vout.

Figure 5B:
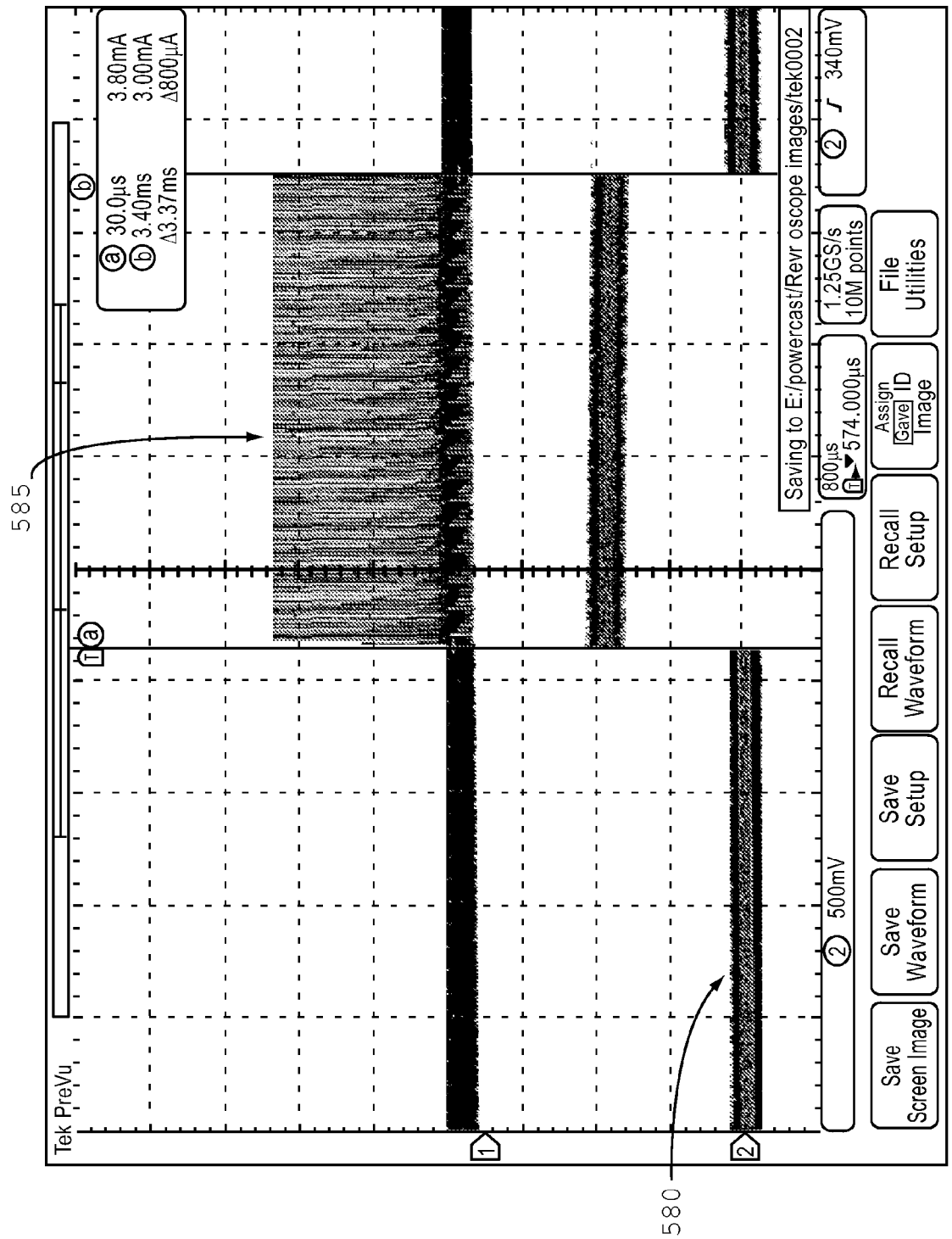
FIGS. 5B-5C illustrate screenshots from an oscilloscope related to an output from the DC-to-DC converter and from the voltage sensor module of FIG. 5A, according to an embodiment.
Figure 5C:
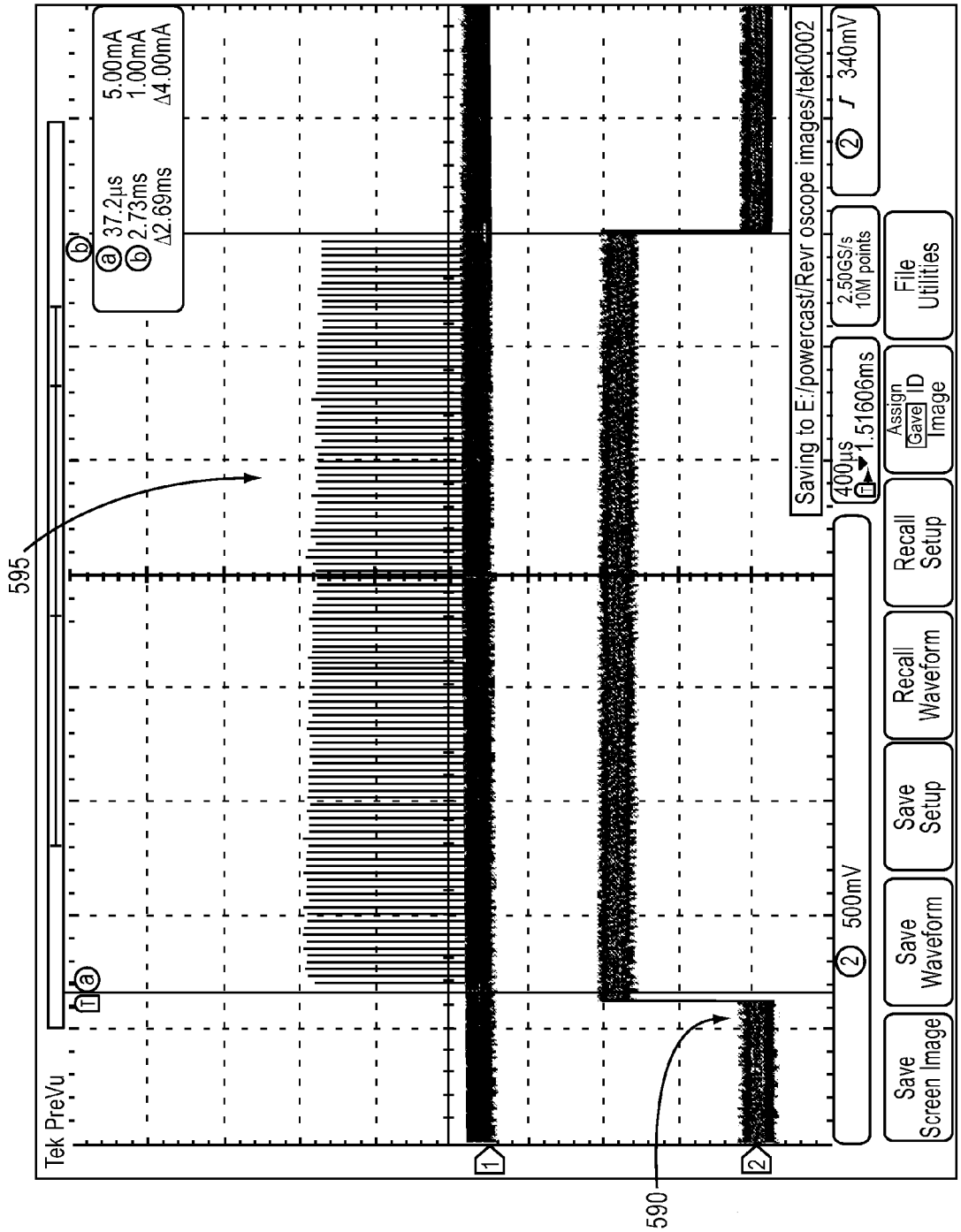

FIGS. 5B-5C illustrate screenshots from an oscilloscope related to an output current from the DC-to-DC converter module 450 and the output O42 from the voltage sensor module 440 described above with respect to FIG. 4A, according to an embodiment. In the examples described in FIGS. 5B-5C, the DC-to-DC converter module 450 is configured to recharge a 3 volt load module or 3 volt battery. FIG. 5B shows the output current from the DC-to-DC converter module 450 as signal 585 and the output O42 as signal 580. The capacitance value of the capacitor 550 in this example is 6.8 nanofarads and the load module or battery charging voltage is 3 volts. The signal 585 includes multiple spikes or pulses near the 100 milliamps peak and extending for a period of time of 2.69 milliseconds.

FIG. 5C shows the output current from the DC-to-DC converter module 450 as signal 595 and the output O42 as signal 590. The capacitance value of the capacitor 550 in this example is 24 nanofarads and the load module or battery charging voltage is 3 volts. The signal 595 includes multiple spikes or pulses with lower peaks and longer duration between peaks than those seen in signal 585 in FIG. 5B. Increasing the capacitance value of the capacitor 550 can result in an increase in the load charging time but at a lower output current.

Figure 6:
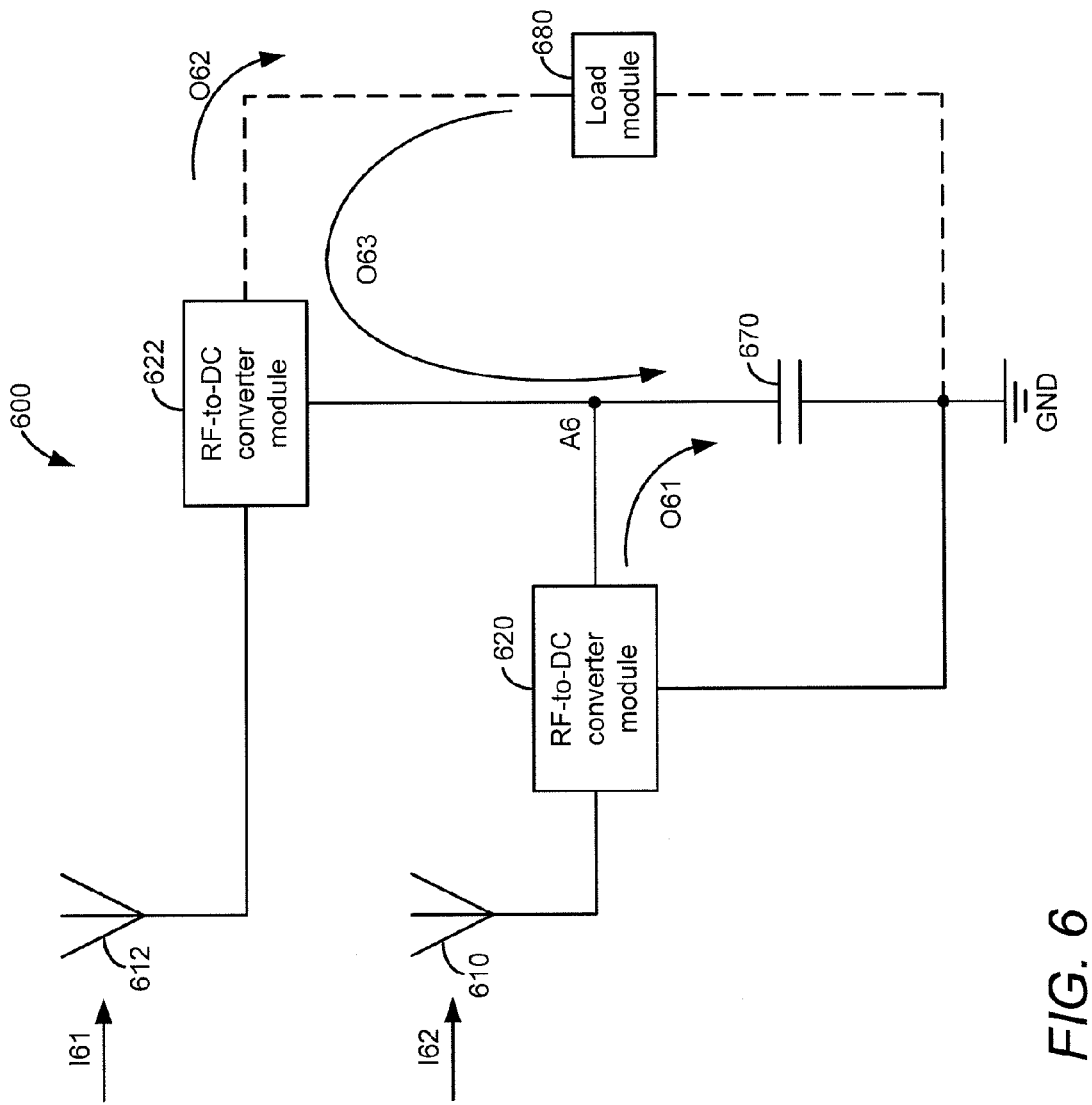
FIG. 6 is a system block diagram of a wireless power receiver with multiple RF-to-DC converter modules, according to an embodiment.

FIG. 6 is a system block diagram of a wireless power receiver 600 with RF-to-DC converter modules 620 and 622, according to an embodiment. The wireless power receiver 600 includes antennas 610 and 612, a capacitor 670, and the RF-to-DC converter modules 620 and 622. In some embodiments, the wireless power receiver 600 can include a load module 680. In other embodiments, the load module 680 is separate from (but coupled to) the wireless power receiver 600. The wireless power receiver 600 is configured to be used in instances when the incident wireless power is very low.

The antennas 612 and 610 can be similar to the antenna 110 described above with respect to FIGS. 1A-1B. The RF-to-DC converter module 620 and 622 can be similar to the RF-to-DC converter modules 120, 221, 223, and 420 described above with respect to FIGS. 1A-1B, FIGS. 2A-2B, and FIG. 4A. The load module 680 can be similar to the load modules 140, 340, and 470 described above with respect to FIGS. 1A-1B, FIG. 3, and FIG. 4A.

The antenna 610 is configured to receive an input I62 having a first wireless power associated with one or more electromagnetic waves. The antenna 612 is configured to receive an input I61 having a second wireless power associated with one or more electromagnetic waves, which can be the same as or different from the electromagnetic waves associated with the input I62. The RF-to-DC converter module 620 is configured to convert the first wireless power associated with the input I62 to a DC power having an associated DC voltage. The RF-to-DC converter module 620 is configured to produce an output O61 having the DC power. The RF-to-DC converter module 620 is configured to send or transfer the DC power to the capacitor 670 via the output O61 to store a charge or power associated with the output O61 in the capacitor 670. A DC voltage at node A6 is the DC voltage associated with the DC power from the RF-to-DC converter module 620. The DC voltage at node A6 can be used to bias the RF-to-DC converter module 622 such that the RF-to-DC converter module 622 can operate more efficiently. In this regard, the DC voltage at node A6 can be used as a virtual ground to increase the voltage of output O62 with respect to system ground, GND, in order to allow the RF-to-DC converter module 622 to more efficiently convert RF power to DC power when the input I61 and the antenna 612 provide relatively low input power levels.

The RF-to-DC converter module 622 is configured to convert the second wireless power associated with the input I61 to a DC power having an associated DC voltage. The RF-to-DC converter module 622 is configured to produce an output O62 having the DC power. The RF-to-DC converter module 622 is configured to send or transfer the DC power to the load module 680 (e.g., rechargeable battery) via the output O62 to store a charge or power associated with the output O62 in the load module 680. The RF-to-DC converter module 622 can be biased by the DC voltage at node A6 such that the RF-to-DC converter module 622 has improved conversion efficiency at low incident wireless power levels.

In this example, the load module 680 can produce an output O63 that includes a reverse leakage or drain current that typically occurs when a device or component to be charged or powered is connected to the charging or powering circuit. The wireless power receiver 600 does not include a diode to block or reduce the reverse leakage or drain current. In this embodiment, the reverse leakage or drain current associated with the output O63 from the load module 680 is not drained to ground (GND) but is instead stored in the capacitor 670 and is used to increase the biasing and efficiency of the RF-to-DC converter module 622.

In some embodiments, the wireless power receiver 600 described above with respect to FIG. 6A can be implemented with a single antenna by replacing antennas 610 and 612 with a single antenna (not shown) followed by an RF splitter (not shown). The RF splitter can be configured to split or separate the wireless power received via the single antenna evenly between RF-to-DC converter modules 622 and 620. In some embodiments, however, it may be desirable that a portion of the received wireless power that is sent to the RF-to-DC converter module 622 be larger than a portion of the received wireless power that is sent to the RF-to-DC converter module 620.

Figure 7:
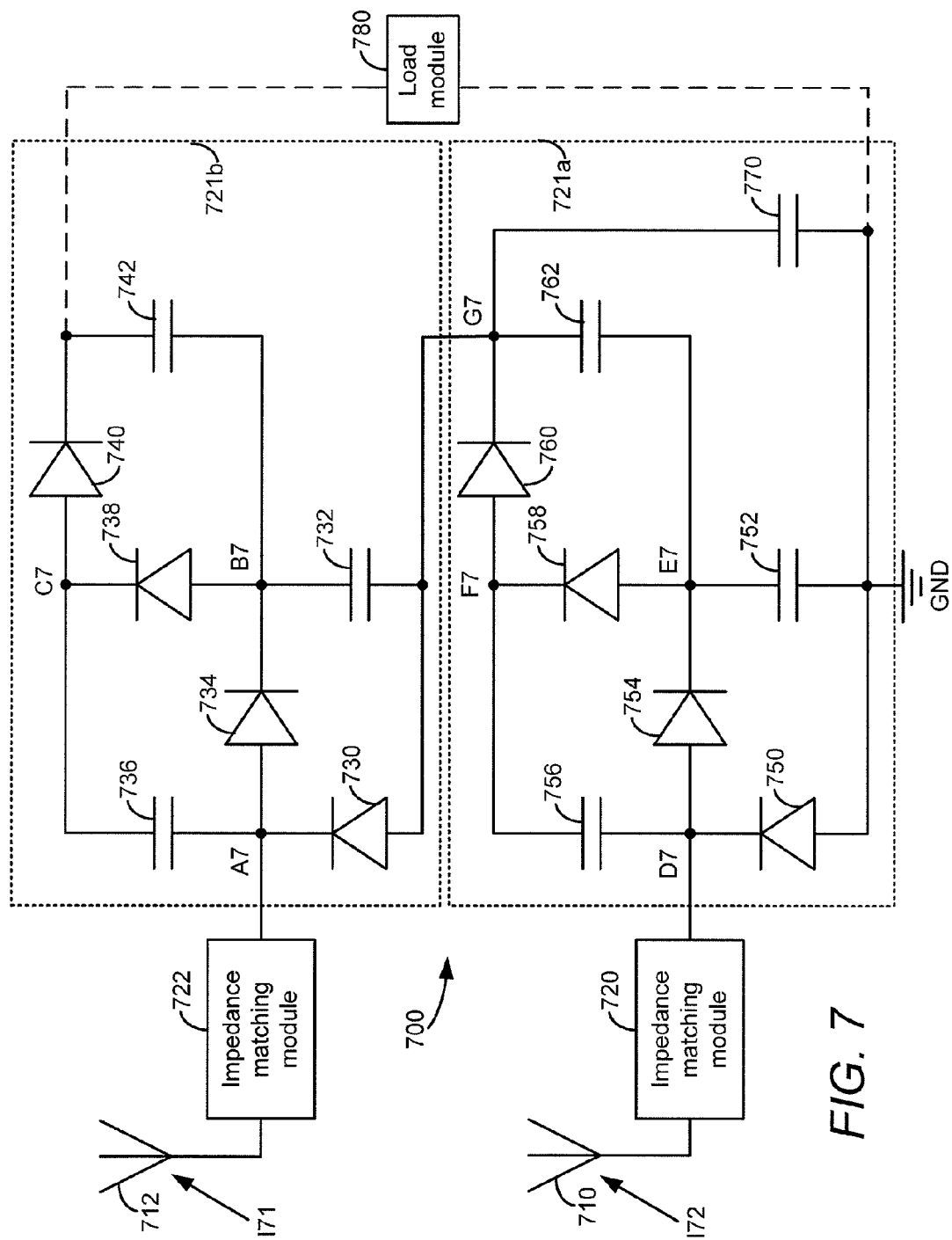
FIG. 7 is a system block diagram of a wireless power receiver with multiple RF-to-DC converter modules, according to another embodiment.

FIG. 7 is a system block diagram of a wireless power receiver 700 with multiple with RF-to-DC converter modules 721a and 721b, according to an embodiment. The wireless power receiver 700 includes antennas 710 and 712, a capacitor 770, impedance matching modules 720 and 722, and the RF-to-DC converter modules 721a and 721b. In some embodiments, the wireless power receiver 700 can include a load module 780. In other embodiments, the load module 780 is separate from (but coupled to) the wireless power receiver 700. The wireless power receiver 700 is configured to be used in instances when the incident wireless power is relatively low. The operation of the wireless power receiver 700 is similar to the operation of the wireless power receiver 600 described above with respect to FIG. 6.

The antennas 712 and 710 can be similar to the antenna 110 described above with respect to FIGS. 1A-1B. The RF-to-DC converter module 721a and 721b can be similar to the RF-to-DC converter module 221 including a Villiard cascade voltage multiplier described above with respect to FIG. 2A. The RF-to-DC converter module 721a includes diodes 750, 754, 758, and 760 and capacitors 752, 756, and 762. The RF-to-DC converter module 721b includes diodes 730, 734, 738, and 740 and capacitors 732, 736, and 742. The impedance matching modules 720 and 722 can be similar to the impedance matching modules 220, 330, and 415 described above with respect to FIGS. 2A-2B, FIG. 3, and FIG. 4A. The load module 780 can be similar to the load modules 140, 340, and 470 described above with respect to FIGS. 1A-1B, FIG. 3, and FIG. 4A.

Figure 8:
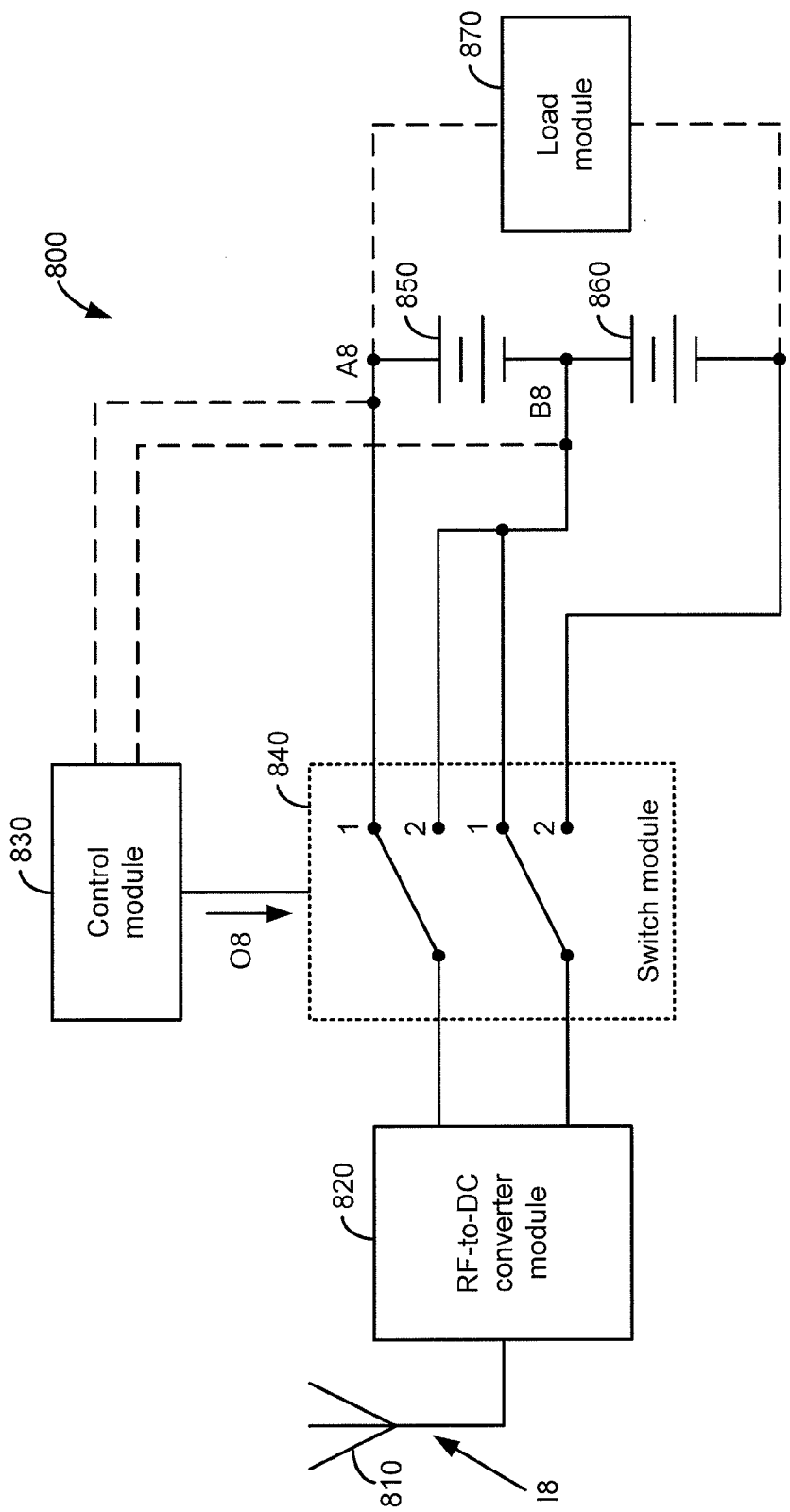
FIG. 8 is a system block diagram of a low-power wireless power receiver with multiple rechargeable batteries, according to an embodiment.

FIG. 8 is a system block diagram of a wireless power receiver 800 with rechargeable batteries 850 and 860, according to an embodiment. The wireless power receiver 800 includes an antenna 810, an RF-to-DC converter module 820, a switch module 840, and the rechargeable batteries 850 and 860. In some embodiments, the wireless power receiver 800 can include a control module 830 and/or a load module 870. In other embodiments, the load module 870 and/or the control module 830 are separate (but coupled to) the wireless power receiver 800.

The antenna 810 can be similar to the antenna 110 described above with respect to FIGS. 1A-1B. The RF-to-DC converter module 820 can be similar to the RF-to-DC converter modules 120, 221, 223, 420, 620, 622, 721a, and 721b described above with respect to FIGS. 1A-1B, FIGS. 2A-2B, FIG. 4A, and FIG. 6. The load module 870 can be similar to the load modules 140, 340, 470, 680, and 780 described above with respect to FIGS. 1A-1B, FIG. 3, FIG. 4A, FIG. 6, and FIG. 7.

The switch module 840 is configured to have a first configuration and a second configuration. The switch module 840 is configured to couple the RF-to-DC converter module 820 to the rechargeable battery 850 when in the first configuration. The switch module 840 is configured to couple the RF-to-DC converter module 820 to the rechargeable battery 860 when in the second configuration. The switch module 840 can be hardware-based, or hardware-based and software-based.

The rechargeable battery 850 is configured to store a charge associated with the DC voltage (e.g., DC power) from the RF-to-DC converter module 820 when the rechargeable battery 850 is coupled to the RF-to-DC converter module 820 via the switch module 840. The rechargeable battery 860 is configured to store a charge associated with the DC voltage from the RF-to-DC converter module 820 when the rechargeable battery 860 is coupled to the RF-to-DC converter module 820 via the switch module 840. The rechargeable battery 850 and the rechargeable battery 860 are collectively configured to charge the load module 870.

The control module 830 is configured to produce an output O8 to configure the switch module 840 in the first configuration or the second configuration. The switch module 840 is configured to receive the output O8 from the control module 830. In some embodiments, the control module 830 is configured to monitor a DC voltage (at node A8) associated with a charge stored in the rechargeable battery 850. The control module 830 is configured to monitor a DC voltage (at node B8) associated with a charge stored in the rechargeable battery 860. The control module is configured to produce the output O8 to configure the switch module 840 in the first configuration or the second configuration based on at least one of the voltage associated with the charge stored in the rechargeable battery 850 or the voltage associated with the charge stored in the rechargeable battery 860. The control module 830 can be hardware-based, or hardware-based and software-based.

In another embodiment, the control module 830 is configured to receive a signal having timing information (e.g., clock, pulse, trigger) from, for example, a processor (not shown). The control module 830 is configured to produce the output O8 to configure the switch module 840 in the first configuration or the second configuration based on the timing information received.

Figure 9A:
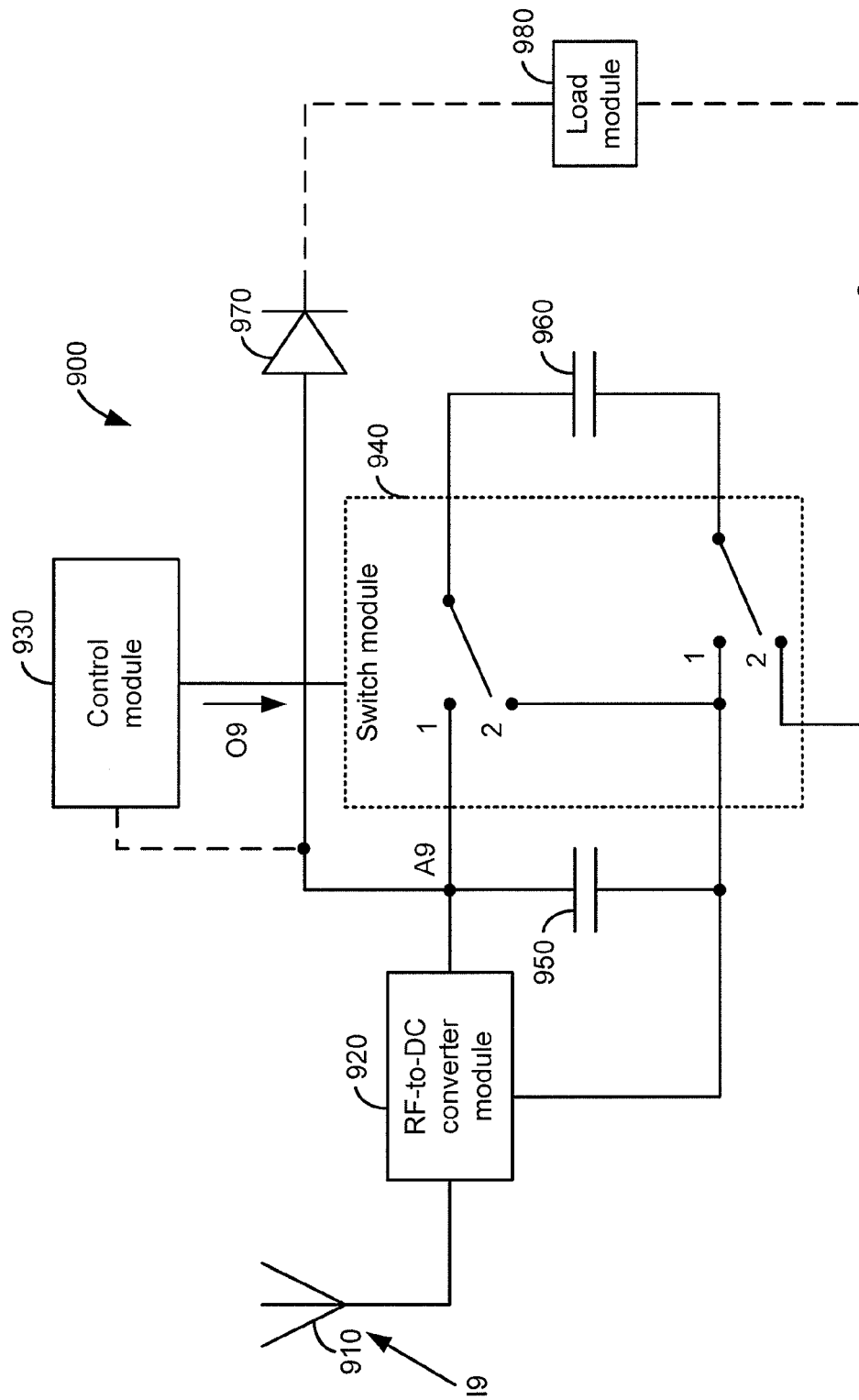
FIGS. 9A-9C are system block diagrams each depicting a wireless power receiver with multiple capacitors, according to an embodiment.
Figure 9B:
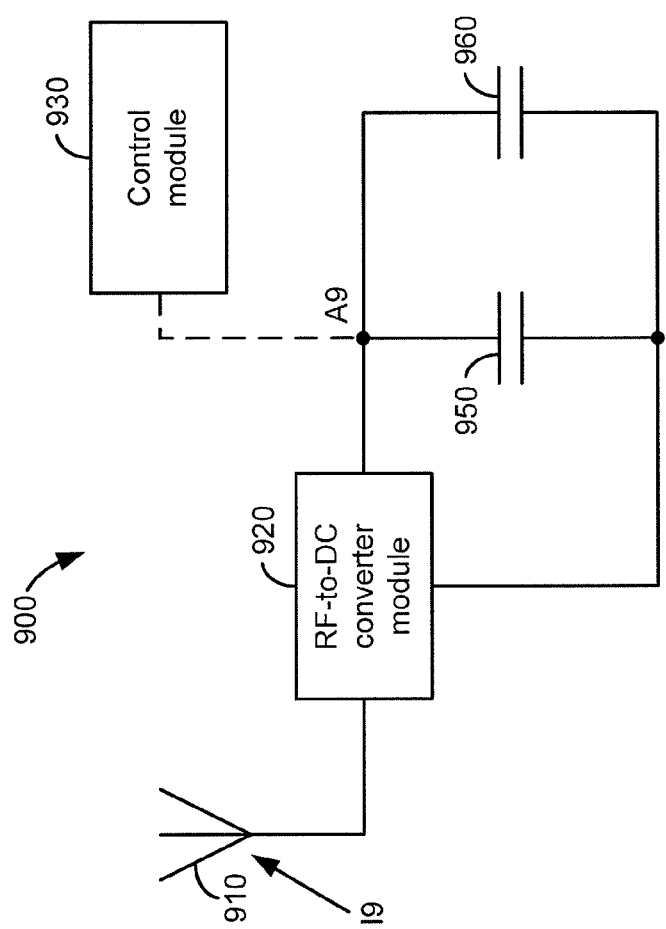
Figure 9C:
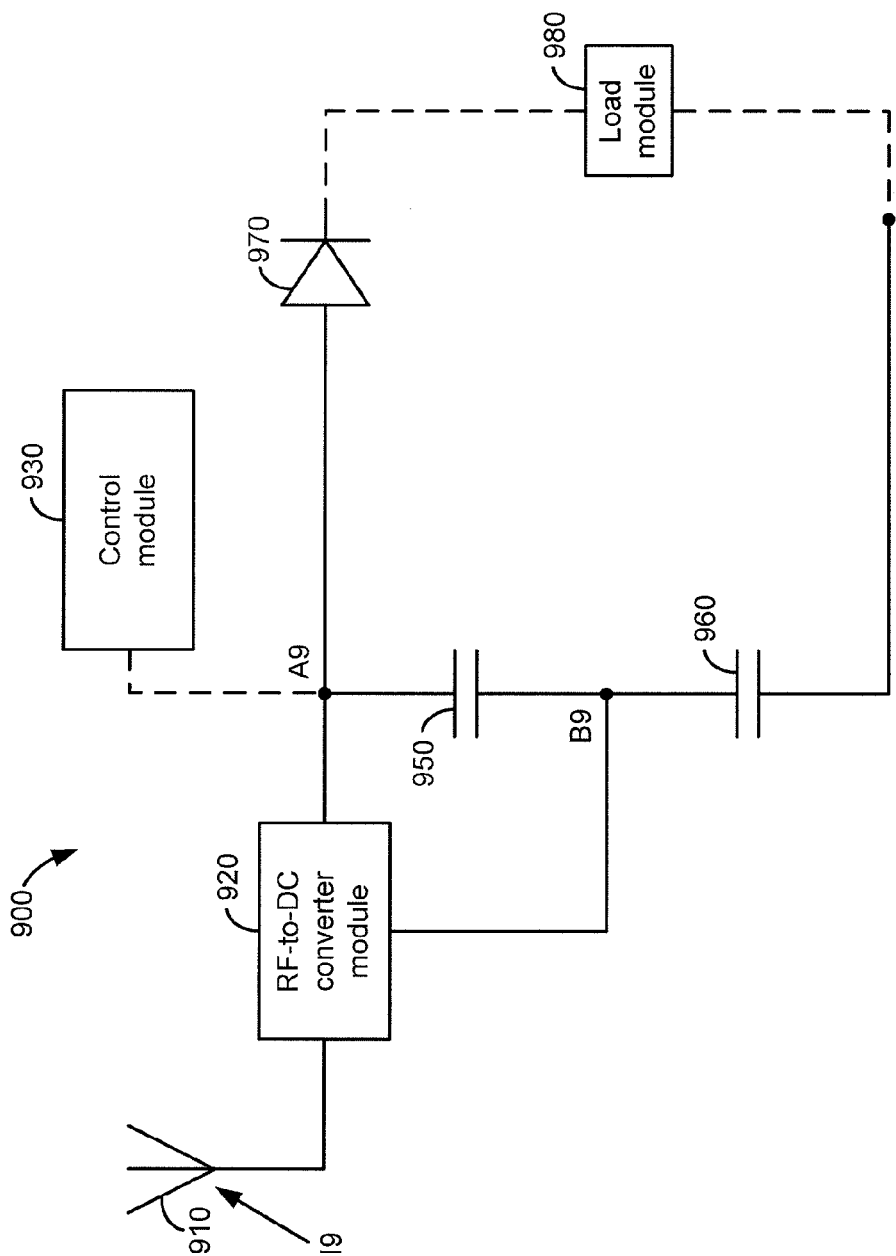

FIGS. 9A-9C are system block diagrams each depicting a wireless power receiver 900 with capacitors 950 and 960, according to an embodiment. The wireless power receiver 900 includes an antenna 910, an RF-to-DC converter module 920, a switch module 940, a diode 970, and the capacitors 950 and 960. In some embodiments, the wireless power receiver 900 can include a control module 930 and/or a load module 980. In other embodiments, the load module 980 and the control module 930 are separate (but coupled to) the wireless power receiver 800.

The antenna 910 can be similar to the antenna 110 described above with respect to FIGS. 1A-1B. The RF-to-DC converter module 920 can be similar to the RF-to-DC converter modules 120, 221, 223, 420, 620, 622, and 820 described above with respect to FIGS. 1A-1B, FIGS. 2A-2B, FIG. 4A, FIG. 6, and FIG. 8. The load module 980 can be similar to the load modules 140, 340, 470, 680, 780, and 870 described above with respect to FIGS. 1A-1B, FIG. 3, FIG. 4A, FIGS. 6-8. The diode 970 can be similar to the diode 460 described above with respect to FIG. 4A.

The switch module 940 is configured to have a first configuration and a second configuration. The switch module 940 is configured to couple the capacitors 950 and 960 and the RF-to-DC converter module 920 in a parallel configuration when in the first configuration. The switch module 940 is configured to couple the capacitors 950 and 960, and the load module 980 in a series configuration when in the second configuration. The switch module 940 can be hardware-based, or hardware-based and software-based.

The capacitor 950 is configured to store a charge associated with the DC voltage (e.g., DC power) from the RF-to-DC converter module 920. The capacitor 960 is configured to store a charge associated with the DC voltage from the RF-to-DC converter module 920 when the capacitor 960 is coupled to the RF-to-DC converter module 920 via the switch module 940. The capacitors 950 and 960 are collectively configured to charge the load module 980 when both the capacitor 950 and the capacitor 960 are coupled to the load module 980 via the switch module 940.

The control module 930 is coupled to the switch module 940. The control module 930 is configured to produce an output O9 to configure the switch module 940 in the first configuration or the second configuration. The switch module 940 is configured to receive the output O9 from the control module 930. In one embodiment, the control module 930 is configured to monitor a voltage (at node A9) associated with a charge stored in the capacitor 950 (and/or the capacitor 960). The control module 930 is configured to produce the output O9 to configure the switch module 940 in the first configuration or the second configuration based on the voltage associated with the charge stored in the capacitor 950. The switch module 940 is configured to receive the output from the control module. The control module 930 can be hardware-based, or hardware-based and software-based.

In another embodiment, the control module 930 is configured to receive a signal having timing information (e.g., clock, pulse, trigger). The control module 930 is configured to produce the output O9 to configure the switch module 940 in the first configuration or the second configuration based on the timing information.

FIG. 9B illustrates the wireless power receiver 900 when the switch module 940 is in the first configuration, and the RF-to-DC converter module 920 and the capacitors 950 and 960 are in a parallel configuration. FIG. 9C illustrates the wireless power receiver 900 when the switch module 940 is in the second configuration, and the capacitors 950 and 960, the diode 970, and the load module 980 are in a series configuration.

Figure 10:
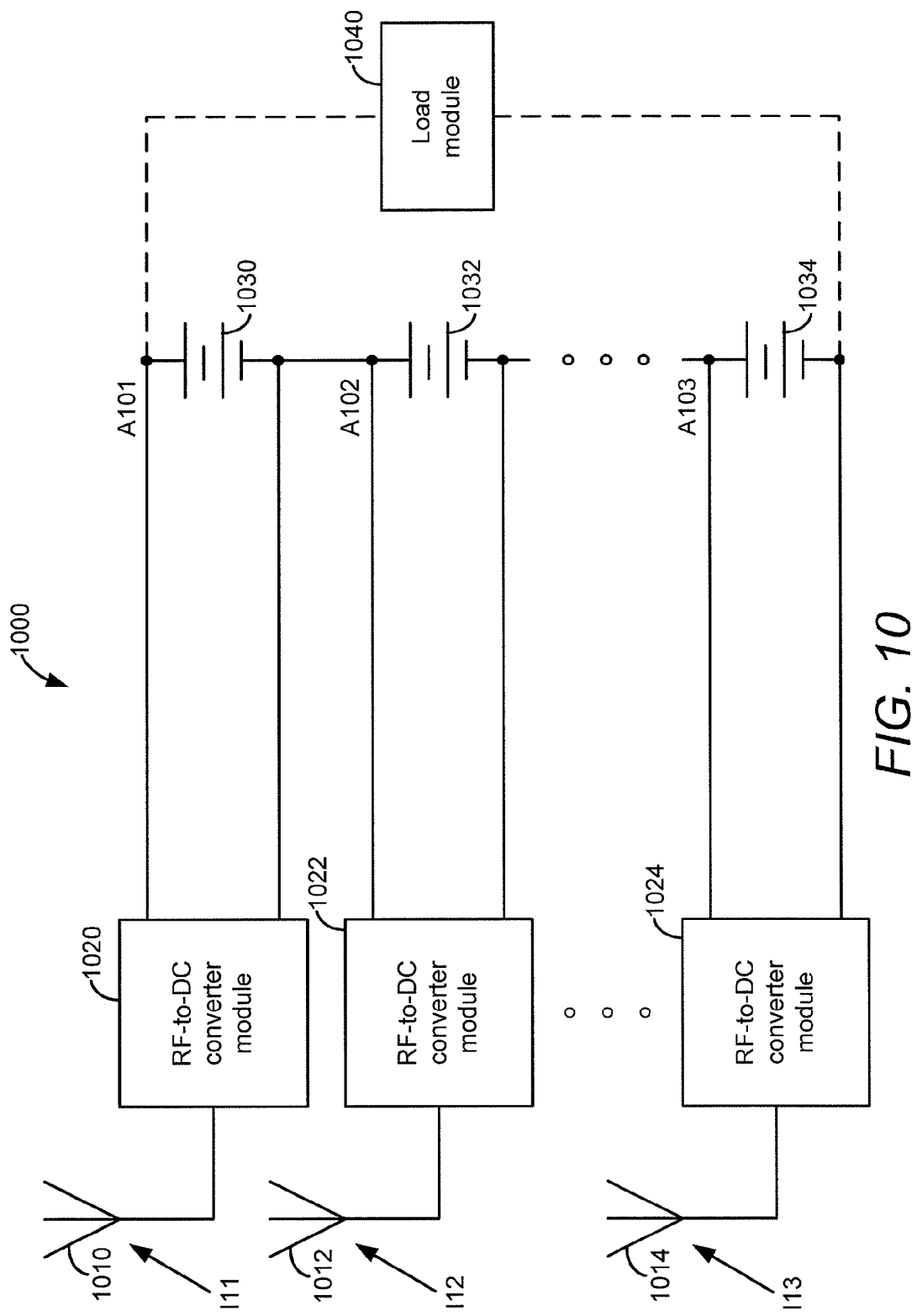
FIG. 10 is a system block diagram of a wireless power receiver with multiple RF-to-DC converter modules and multiple rechargeable batteries, according to an embodiment.

FIG. 10 is a system block diagram of a wireless power receiver 1000 with multiple RF-to-DC converter modules 1020, 1022, . . . , 1024, and multiple rechargeable batteries 1030, 1032, . . . , 1034, according to an embodiment. The wireless power receiver 1000 includes multiple antennas 1010, 1012, . . . , 1014, the RF-to-DC converter modules 1020, 1022, . . . , 1024, and the rechargeable batteries 1030, 1032, . . . , 1034. In some embodiments, the wireless power receiver 1000 includes the load module 1040. In other embodiments, the load module 1040 is separate from (but coupled to) the wireless power receiver 1000.

Each RF-to-DC converter module from the multiple RF-to-DC converter modules 1020, 1022, . . . , 1024 converts a wireless power received via an associated antenna to a DC power. The DC power from a given RF-to-DC converter is stored in an associated rechargeable battery from the multiple rechargeable batteries 1030, 1032, . . . , 1034. The multiple rechargeable batteries 1030, 1032, . . . , 1034 are configured in a series configuration and collectively charge or power the load module 1040.

Figure 11A:
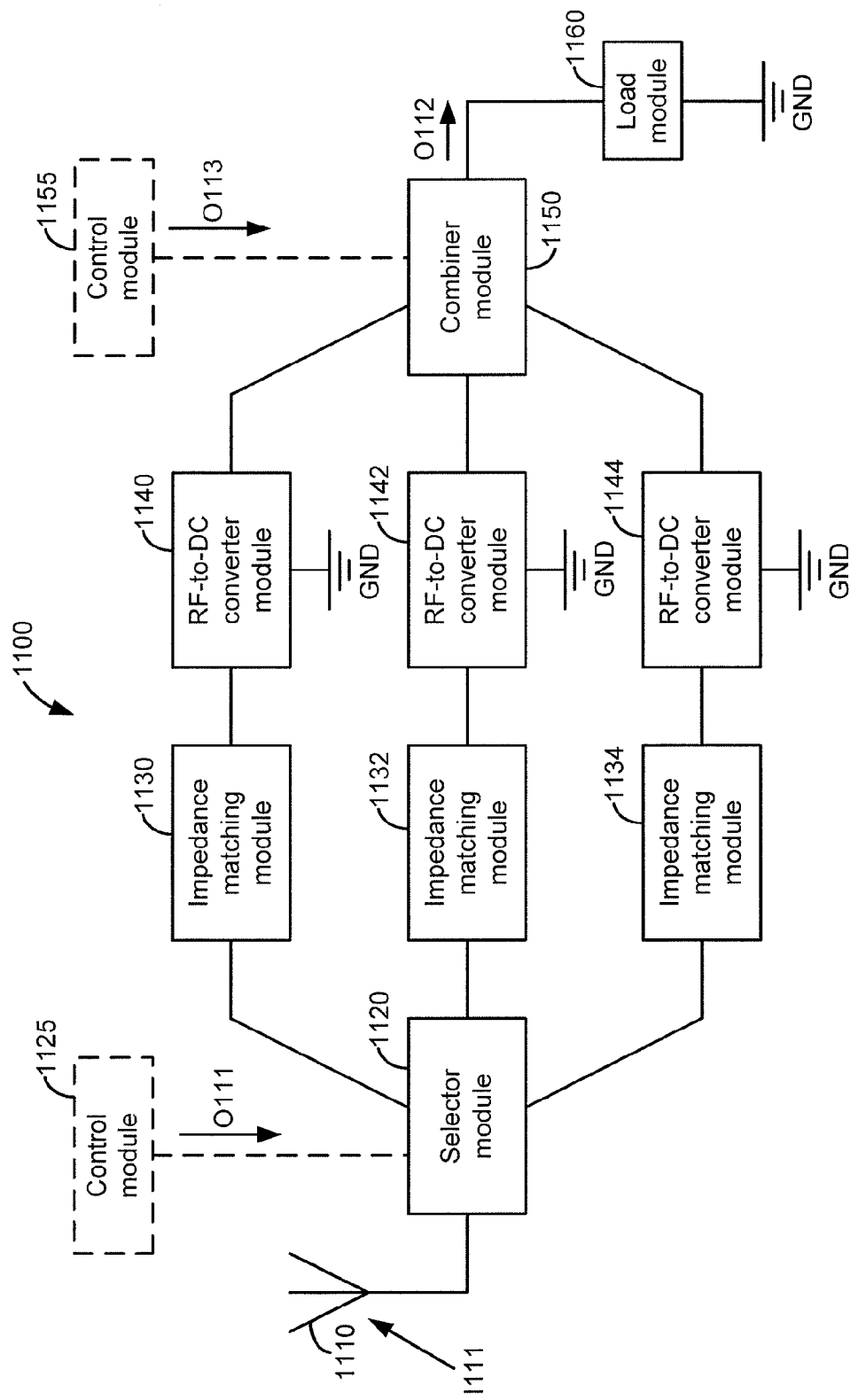
FIGS. 11A-11B are system block diagrams each depicting a wireless power receiver with multiple parallel RF-to-DC paths, according to an embodiment.
Figure 11B:
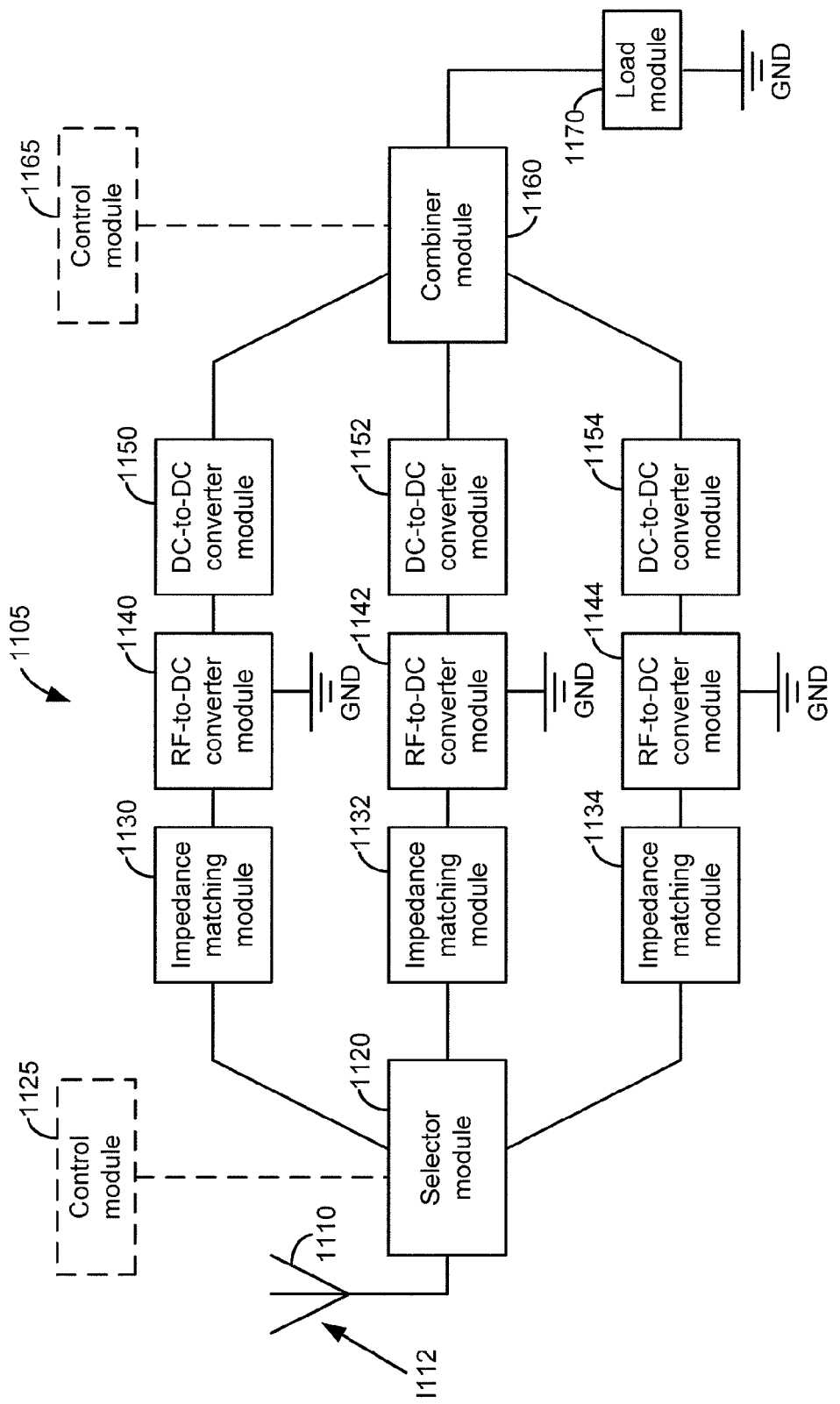

FIGS. 11A-11B are system block diagrams each depicting a wireless power receiver with two or more parallel RF-to-DC conversion paths, according to an embodiment. FIG. 11A shows a wireless power receiver 1100 that includes an antenna 1110, a selector module 1120, a combiner module 1150, multiple impedance matching modules 1130, 1132, and 1134, and multiple RF-to-DC converter modules 1140, 1142, and 1144. In some embodiments, the wireless power receiver 1100 can include a control module 1125, a control module 1155, and/or a load module 1160. In other embodiments, the load module 1160 and the control module 1155 can be separate from (but coupled to) the wireless power receiver 1100.

A first RF-to-DC conversion path includes the impedance matching module 1130 and the RF-to-DC converter module 1140. A second RF-to-DC conversion path includes the impedance matching module 1132 and the RF-to-DC converter module 1142. A third RF-to-DC conversion path includes the impedance matching module 1134 and the RF-to-DC converter module 1144. In one embodiment, each of the RF-to-DC conversion paths is optimized for a particular frequency band. For example, the impedance matching module 1130 in the first RF-to-DC conversion path can be configured to match a characteristic impedance of the antenna 1110 to an input impedance of the RF-to-DC converter module 1140 over a predetermined frequency band that includes frequencies $f_1$ to $f_2$. In another example, the impedance matching module 1132 of the second RF-to-DC conversion path can be configured to match the characteristic impedance of the antenna 1110 to an input impedance of the RF-to-DC converter module 1142 over a predetermined frequency band that includes frequencies $f_3$ to $f_4$. In yet another example, the impedance matching module 1134 of the third RF-to-DC conversion path can be configured to match the characteristic impedance of the antenna 1110 to an input impedance of the RF-to-DC converter module 1144 over a predetermined frequency band that includes frequencies $f_5$ to $f_6$. In some embodiments, each of the RF-to-DC conversion paths may be configured to operate (e.g., optimized) over a portion of a frequency band associated with the operation of the wireless power receiver 1100. In another embodiment, the wireless power receiver 1100 can be configured to operate over multiple and distinct frequency bands such as, but not limited to, frequency bands associated with 915 megahertz (MHz), 2.45 gigahertz (GHz), and 5.8 GHz frequencies. In this example, each of the RF-to-DC conversion paths can be configured to operate over one of the frequency bands supported by the wireless power receiver 1100.

The selector module 1120 is configured to receive a wireless power associated with an input I111 received via the antenna 1110. The selector module 1120 can be a passive device or an active device. When the selector module 1120 is a passive device, the wireless power received via the antenna 1110 is transferred to the first RF-to-DC conversion path, the second RF-to-DC conversion path, and/or the third RF-to-DC conversion path in accordance with the impedance matching that occurs between the antenna 1110 and the RF-to-DC converter modules 1140, 1142, and 1144 via the impedance matching modules 1130, 1132, and 1134, respectively. When the selector module 1120 is an active device, the wireless power received via the antenna 1110 is transferred to the first RF-to-DC conversion path, the second RF-to-DC conversion path, and/or the third RF-to-DC conversion path in accordance with an output O111 produced by the control module 1125. The control module 1125 is configured to control the operation of the selector module 1120 based on, for example, timing information and/or radio frequency spectrum information associated with the wireless power received by the antenna 1110.

When the selector module 1120 is passive, it is desirable that a given impedance matching module be configured such that wireless power associated with the appropriate frequencies is received by the RF-to-DC conversion path and wireless power associated with frequencies associated with other RF-to-DC conversion paths is reflected. Such a result can be produced having that impedance matching module configured to match the characteristic impedance of the antenna 1110 over the desired frequency band, while providing a high impedance to the antenna 1110 in the frequency bands associated with the other RF-to-DC conversion paths.

When the selector module 1120 is active, it may be desirable that the selector module 1120 be configured to determine a frequency or frequencies associated with the wireless power received from the antenna 1110 and transfer (e.g., route) the wireless power to an appropriate RF-to-DC conversion path based on the determined frequency or frequencies. This frequency-based transfer or routing can also be implemented using the control module 1125 via its output O111.

The combiner module 1150 is configured to receive a DC power from each of the RF-to-DC converter modules 1140, 1142, and 1144. The combiner module 1150 is configured to combine, add, adjust, and/or modify the DC powers received from the RF-to-DC converter modules 1140, 1142, and 1144. The combiner module 1150 can be a passive device or an active device. When the combiner module 1150 is a passive device, the DC powers from the RF-to-DC converter modules 1140, 1142, and 1144 are processed in the combined module 1150 without any external control. The combiner module 1150 is configured to produce an output O112 that includes a DC power produced by the combiner module 1150. The DC power produced by the combiner module 1150 can be used to charge or operate the load module 1160. When the combiner module 1150 is an active device, a control module 1155 is configured to control the operation of the combiner module 1150 based on, for example, timing information and/or radio frequency spectrum information associated with the wireless power received by the antenna 1110. The combiner module 1150, the selector module 1120, the control module 1125, and/or the control module 1155 can be hardware-based, or hardware-based and software-based.

Having multiple RF-to-DC conversion paths can result in a larger output power because the frequency-based parallel rectification approach described above with respect to FIG. 11A allows for the processing of separate portions of an incident wireless power associated with a wide range of frequencies or incident wireless power associated with multiple frequency bands to occur concurrently. In one example, a given RF-to-DC converter associated with a first RF-to-DC conversion path can have a central operating frequency of 900 MHz with a bandwidth of 100 MHz (+/−50 MHz) at a given incident wireless power input level. By adding a second RF-to-DC conversion path with an RF-to-DC converter having a central operating frequency of 1000 MHz and a bandwidth of 100 MHz (+/−50 MHz), the effective bandwidth of the RF-to-DC conversion is increased to a range from about 850 MHz to 1050 MHz. Such an approach can be relevant for ambient energy or power harvesting where there can be multiple sources of wireless power, each associated with a particular frequency band.

FIG. 11B shows a wireless power receiver 1105 that is similar to the wireless power receiver 1100 described above with respect to FIG. 11B but further includes one or more DC-to-DC converter modules 1150, 1152, and 1154. The first RF-to-DC conversion path now includes the impedance matching module 1130, the RF-to-DC converter module 1140, and the DC-to-DC converter module 1150. The second RF-to-DC conversion path now includes the impedance matching module 1132, the RF-to-DC converter module 1142, and the DC-to-DC converter module 1152. The third RF-to-DC conversion path now includes the impedance matching module 1134, the RF-to-DC converter module 1144, and the DC-to-DC converter module 1154. A description of using multiple paths for conversion to DC is provided in U.S. patent application Ser. No. 11/584,983, entitled "Method and Apparatus for High Efficiency Rectification for Various Loads," filed on Oct. 23, 2006, which is incorporated herein by reference in its entirety.

CONCLUSION

While various embodiments have been described above, it should be understood that they have been presented by way of example only, and not limitation. For example, the wireless power receiver described herein can include various combinations and/or sub-combinations of the components and/or features of the different embodiments described. It should be understood that the wireless power receiver can receive power from more than one source of wireless power.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magnetoOptical storage media such as optical disks, and readOnly memory ("ROM") and random-access memory ("RAM") devices. Examples of computer code include, but are not limited to, micro-code or micro-instructions, machine instructions, such as produced by a compiler, and files containing higher-level instructions that are executed by a computer using an interpreter. For example, an embodiment of the invention can be implemented using Java, C++, or other objectOriented programming language and development tools. Additional examples of computer code include, but are not limited to, control signals, encrypted code, and compressed code.

What is claimed is:

1. An apparatus, comprising:
a first converter module configured to convert a wireless power associated with an electromagnetic wave to a first DC voltage;
a sensor module configured to monitor the first DC voltage, the sensor module configured to produce an output associated with the first DC voltage, the sensor module configured to maintain the first DC voltage between a first threshold voltage and a second threshold voltage; and
a second converter module configured to convert the first DC voltage to a second DC voltage larger than the first DC voltage, the second converter module configured to be enabled by the output from the sensor module when the first DC voltage is above the first threshold voltage, the second converter module configured to be disabled by the output from the sensor module when the first DC voltage is below the second threshold voltage lower than the first threshold voltage, the second converter module configured to provide power to a load device based on the second DC voltage;
an antenna configured to receive the electromagnetic wave; and
an impedance matching module configured to substantially match an impedance of the first converter module and an impedance of the antenna over a frequency range including a center frequency associated with the electromagnetic wave, when the first DC voltage is maintained between the first threshold voltage and the second threshold voltage.

2. The apparatus of claim 1, further comprising:
a storage device coupled to the first converter module, the sensor module, and the second converter module, the storage device configured to store a charge associated with the first DC voltage.

3. The apparatus of claim 1, further comprising:
the first converter module including a voltage multiplier having an input portion and an output portion, the input portion of the voltage multiplier coupled to the antenna via the impedance matching module, the output portion of the voltage multiplier coupled to the sensor module and the second converter.

4. The apparatus of claim 1, further comprising:
the first converter module including a full-wave rectifier having an input portion and an output portion, the input portion of the full-wave rectifier coupled to the antenna via the impedance matching module, the output portion of the full-wave rectifier coupled to the sensor module and the second converter.

5. The apparatus of claim 1, wherein the second converter module includes a boost converter module.

6. The apparatus of claim 1, further comprising:
a load device; and
a rectifying device coupled to the second converter module and the load device, the rectifying device configured to limit a reverse current from the load device to the second converter module.

7. The apparatus of claim 1, wherein the wireless power is a first wireless power, the impedance matching module is a first impedance module, the apparatus further comprising:
a third converter module configured to convert a second wireless power associated with the electromagnetic wave to a third DC voltage;
a fourth converter module configured to convert the third DC voltage to a fourth DC voltage larger than the third DC voltage,
a second impedance matching module configured to substantially match an impedance of the third converter module and the impedance of the antenna over a second frequency range different from the first frequency range;
a selector module configured to couple the first impedance matching module and the second impedance matching module to the antenna; and
a combiner module configured to add the second DC voltage from the second converter module and the fourth DC voltage from the fourth converter module to produce a combined voltage, the combiner module configured to charge a load device based the combined voltage.

8. The apparatus of claim 1, wherein the wireless power is a first wireless power, the impedance matching module is a first impedance matching module, the apparatus further comprising:
a third converter module configured to convert a second wireless power associated with the electromagnetic to a third DC voltage;
a fourth converter module configured to convert the third DC voltage to a fourth DC voltage larger than the third DC voltage,
a second impedance matching module configured to substantially match an impedance of the third converter module and the impedance of the antenna over a second frequency range different from the first frequency range;
a selector module having a first configuration or a second configuration, the selector module configured to couple the first impedance matching module to the antenna when in the first configuration, the selector module configured to couple the second impedance matching module to the antenna when in the second configuration;
a control module configured to produce an output to configure the selector module in the first configuration or the second configuration, the selector module configured to receive the output from the control module; and
a combiner module configured to add the second DC voltage from the second converter module and the fourth DC voltage from the fourth converter module to produce a combined voltage, the combiner module configured to provide power to a load device based on the combined voltage.

9. The apparatus of claim 1, wherein the antenna is a first antenna, the wireless power is a first wireless power, the apparatus further comprising:
a third converter module configured to convert a second wireless power received via a second antenna to a third DC voltage; and
a storage device configured to store a charge associated with the third DC voltage;
the first converter module configured to be biased by the charge from the storage device.

10. The apparatus of claim 9, wherein the third converter module includes an impedance matching module configured to substantially match an impedance of the third converter module and an impedance of the second antenna over a frequency range that includes at least a portion of a frequency spectrum associated with the second wireless power.

11. The apparatus of claim 9, wherein:
the third converter module includes a voltage multiplier having an input portion and an output portion, the input portion of the voltage multiplier coupled to the second antenna, the output portion of the voltage multiplier coupled to the storage device and the first converter module.

12. The apparatus of claim 9, wherein:
the first wireless power is associated with a first radio frequency spectrum, and
the second wireless power is associated with a second radio frequency spectrum different from the first radio frequency spectrum.

13. The apparatus of claim 1, wherein the wireless power is a first wireless power, the apparatus further comprising:
a third converter module configured to convert a second wireless power associated with the electromagnetic wave to a third DC voltage.

14. The apparatus of claim 13, further comprising:
a splitter operatively coupled to the antenna, the splitter configured to provide the first wireless power to the first converter and the second wireless power to the third converter.

15. The apparatus of claim 13, further comprising:
a load module operatively coupled to the third converter module.

16. An apparatus, comprising:
a first storage device;
a second storage device;
a converter module configured to convert a wireless power received via an antenna to a DC voltage; and
a switch module having a first configuration and a second configuration, the switch module configured to couple the converter module to the first storage device when in the first configuration, the switch module configured to couple the converter module to the second storage device when in the second configuration;
the first storage device configured to store a charge associated with the DC voltage from the converter module when the first storage device is coupled to the converter module via the switch module, the second storage device configured to store a charge associated with the DC voltage from the converter module when the second storage device is coupled to the converter module via the switch module, the first storage device and the second storage device collectively configured to charge a load device.

17. The apparatus of claim 16, further comprising:
a control module configured to produce an output to configure the switch module in the first configuration or the second configuration, the switch module configured to receive the output from the control module.

18. The apparatus of claim 16, further comprising:
a control module configured to monitor a voltage associated with a charge stored in the first storage device and a charge stored in the second storage device, the control module configured to produce an output to configure the switch module in the first configuration or the second configuration based on at least one of the voltage associated with the charge stored in the first storage device and the voltage associated with the charge stored in the second storage device, the switch module configured to receive the output from the control module.

19. The apparatus of claim 16, further comprising:
a control module configured to receive a signal having timing information, the control module configured to produce an output to configure the switch module in the first configuration or the second configuration based on the timing information, the switch module configured to receive the output from the control module.

20. An apparatus, comprising:
a first storage device;
a second storage device;
a converter module configured to convert a wireless power received via an antenna to a DC voltage; and
a switch module having a first configuration and a second configuration, the switch module configured to couple the first storage device, the second storage device, and the converter module in a parallel configuration when in the first configuration, the switch module configured to couple the first storage device, the second storage device, and a load in a series configuration when in the second configuration;
the first storage device configured to store a charge associated with the DC voltage from the converter module when the first storage device is coupled to the converter module via the switch module, the second storage device configured to store a charge associated with the DC voltage from the converter module when the second storage device is coupled to the converter module via the switch module, the first storage device and the second storage device collectively configured to charge the load device when the first storage device and the second storage device are coupled to the load device via the switch module.

21. The apparatus of claim 20, further comprising:
a control module coupled to the switch module, the control module configured to produce an output to configure the switch module in the first configuration or the second configuration, the switch module configured to receive the output from the control module.

22. The apparatus of claim 20, further comprising:
a control module coupled to the switch module, the control module configured to monitor a voltage associated with a charge stored in the first storage device, the control module configured to produce an output to configure the switch module in the first configuration or the second configuration based on the voltage associated with the charge stored in the first storage device, the switch module configured to receive the output from the control module.

23. The apparatus of claim 20, further comprising:
a control module coupled to the switch module, the control module configured to receive a signal having timing information, the control module configured to produce an output to configure the switch module in the first configuration or the second configuration based on the timing information, the switch module configured to receive the output from the control module.

* * * * *